（12) United States Patent
Gleason et al.

(10) Patent No.: US 10,131,509 B2
(45) Date of Patent: *Nov. 20, 2018

(54) PIT SEAL AND 360-DEGREE TRAILER SEAL FOR A TELESCOPING LIP DOCK LEVELER

(71) Applicant: Nordock, Inc., Bowmanville, Ontario (CA)

(72) Inventors: Denis Gleason, Bowmanville (CA); David Harrington, Port Hope (CA)

(73) Assignee: Nordock, Inc., Bowmanville, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/721,681

(22) Filed: Sep. 29, 2017

(65) Prior Publication Data

US 2018/0029810 A1 Feb. 1, 2018

Related U.S. Application Data

(63) Continuation-in-part of application No. 15/079,021, filed on Mar. 23, 2016, now Pat. No. 9,783,379.

(60) Provisional application No. 62/137,152, filed on Mar. 23, 2015.

(51) Int. Cl.
*B65G 69/00* (2006.01)
*F16J 15/02* (2006.01)
*E04F 19/02* (2006.01)

(52) U.S. Cl.
CPC ......... *B65G 69/008* (2013.01); *B65G 69/001* (2013.01); *B65G 69/003* (2013.01); *F16J 15/022* (2013.01); *E04F 19/026* (2013.01)

(58) Field of Classification Search
CPC .... B65G 69/008; B65G 69/001; E04F 19/026
See application file for complete search history.

(56) References Cited

U.S. PATENT DOCUMENTS

| | | | |
|---|---|---|---|
| 3,230,675 A | 1/1966 | Frommelt |
| 3,403,489 A | 10/1968 | Frommelt |
| 3,714,745 A | 2/1973 | O'Neal |
| 3,826,049 A | 7/1974 | Frommelt |
| 3,939,614 A | 2/1976 | Frommelt |
| 4,020,607 A | 5/1977 | Bjervig |

(Continued)

*Primary Examiner* — Rodney Mintz
(74) *Attorney, Agent, or Firm* — Jeffrey S. Sokol

(57) ABSTRACT

The present invention is a pivoting pit seal assembly that forms a continuous seal with the rear bumper of a trailer parked in the bay of a loading dock, and which combines with the side and top seals of the loading dock to provide a 360 degree seal around a trailer. The pit seal assembly has a compression pad mounted to a rigid base. The pad has a resilient, compressible core material wrapped by a durable cover. One side of the base is pivotally held by brackets and corresponding releasable latches anchored to the front wall adjacent the pit floor or directly to the pit floor. During use, the pit seal is held in an upwardly angled position to compressingly engage the rear bumper of the trailer and form a continuous seal with the bumper. Each side end of the pit seal sealingly engages the vertical side seals located along the sides of the door opening to form a continuous seal between the pit seal and the side seals. To clean or access the pit, the releasable fastener is unfastened and the pit seal is rotated to a reclined position.

18 Claims, 37 Drawing Sheets

(56) References Cited

U.S. PATENT DOCUMENTS

| | | | |
|---|---|---|---|
| 4,213,279 A | 7/1980 | Layne | |
| 4,293,969 A | 10/1981 | Frommeft | |
| 4,328,273 A | 5/1982 | Yackiw | |
| 4,365,452 A | 12/1982 | Fillman | |
| 4,422,199 A | 12/1983 | Frommelt | |
| 4,557,008 A | 12/1985 | Jurden | |
| 4,638,612 A | 1/1987 | Bennett | |
| 4,679,364 A | 7/1987 | Fettig | |
| 4,682,382 A | 7/1987 | Bennett | |
| 4,711,059 A | 12/1987 | Layne | |
| 4,805,362 A | 2/1989 | Frommelt | |
| 5,048,246 A | 9/1991 | Sullivan | |
| 5,109,639 A | 5/1992 | Moore | |
| 5,282,342 A | 2/1994 | Brockman | |
| 5,442,825 A | 8/1995 | Hahn | |
| 5,622,016 A | 4/1997 | Frommett | |
| 6,073,402 A | 6/2000 | Moody | |
| 6,170,205 B1 | 1/2001 | Styba | |
| 6,502,268 B2 | 1/2003 | Ashelin | |
| 6,948,285 B2 | 9/2005 | Miller | |
| 6,951,084 B2 | 10/2005 | Borgerding | |
| 7,146,673 B1 | 12/2006 | Digmann | |
| 7,594,290 B2 | 9/2009 | Eungard | |
| 7,757,442 B2 | 7/2010 | Hoffmann | |
| 8,006,338 B2 | 8/2011 | Kimener | |
| 8,915,029 B2 | 12/2014 | Digmann | |
| 9,187,271 B2 | 11/2015 | Digmann | |
| 9,273,512 B2 | 3/2016 | Digmann | |
| 9,751,703 B2 * | 9/2017 | Digmann | B65G 69/008 |
| 9,783,379 B2 * | 10/2017 | Gleason | B65G 69/008 |
| 9,797,127 B2 * | 10/2017 | Digmann | E04B 1/344 |
| 9,797,128 B2 * | 10/2017 | Digmann | E04B 1/344 |
| 9,914,603 B2 * | 3/2018 | Heim | B65G 69/008 |
| 9,944,474 B2 * | 4/2018 | Heim | B65G 69/008 |
| 2003/0145535 A1 | 8/2003 | DiBiase | |
| 2004/0020141 A1 | 2/2004 | Borgerding | |
| 2005/0102929 A1 | 5/2005 | Hoffmann | |
| 2006/0026912 A1 | 2/2006 | Eungard | |
| 2006/0032159 A1 | 2/2006 | Eungard | |
| 2006/0090407 A1 | 5/2006 | Hoffmann | |
| 2013/0221624 A1 | 8/2013 | Digmann | |
| 2016/0280478 A1 * | 9/2016 | Gleason | B65G 69/008 |
| 2017/0283193 A1 * | 10/2017 | Heim | B65G 69/008 |
| 2018/0050877 A1 * | 2/2018 | Heim | B65G 69/008 |

\* cited by examiner

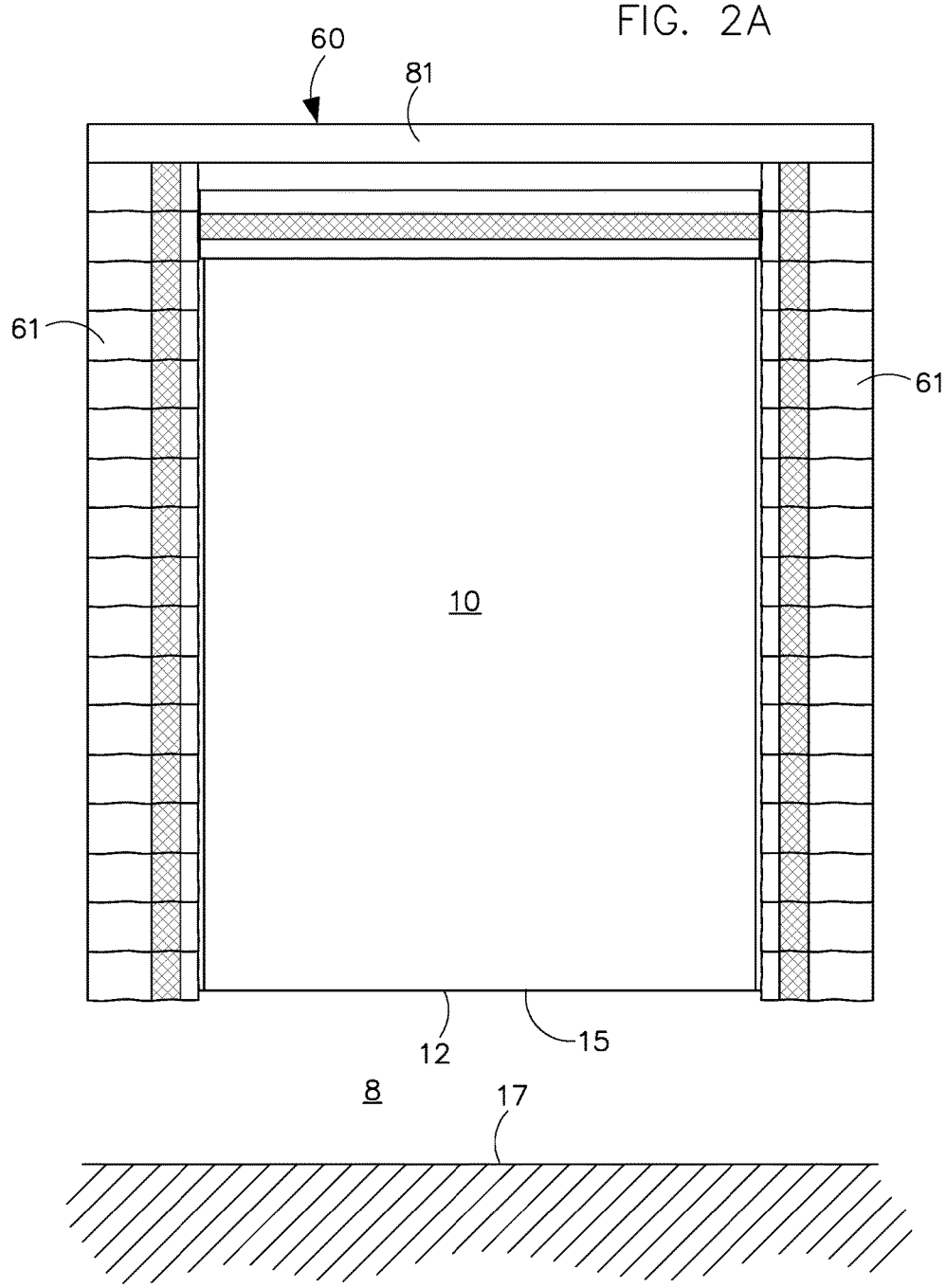

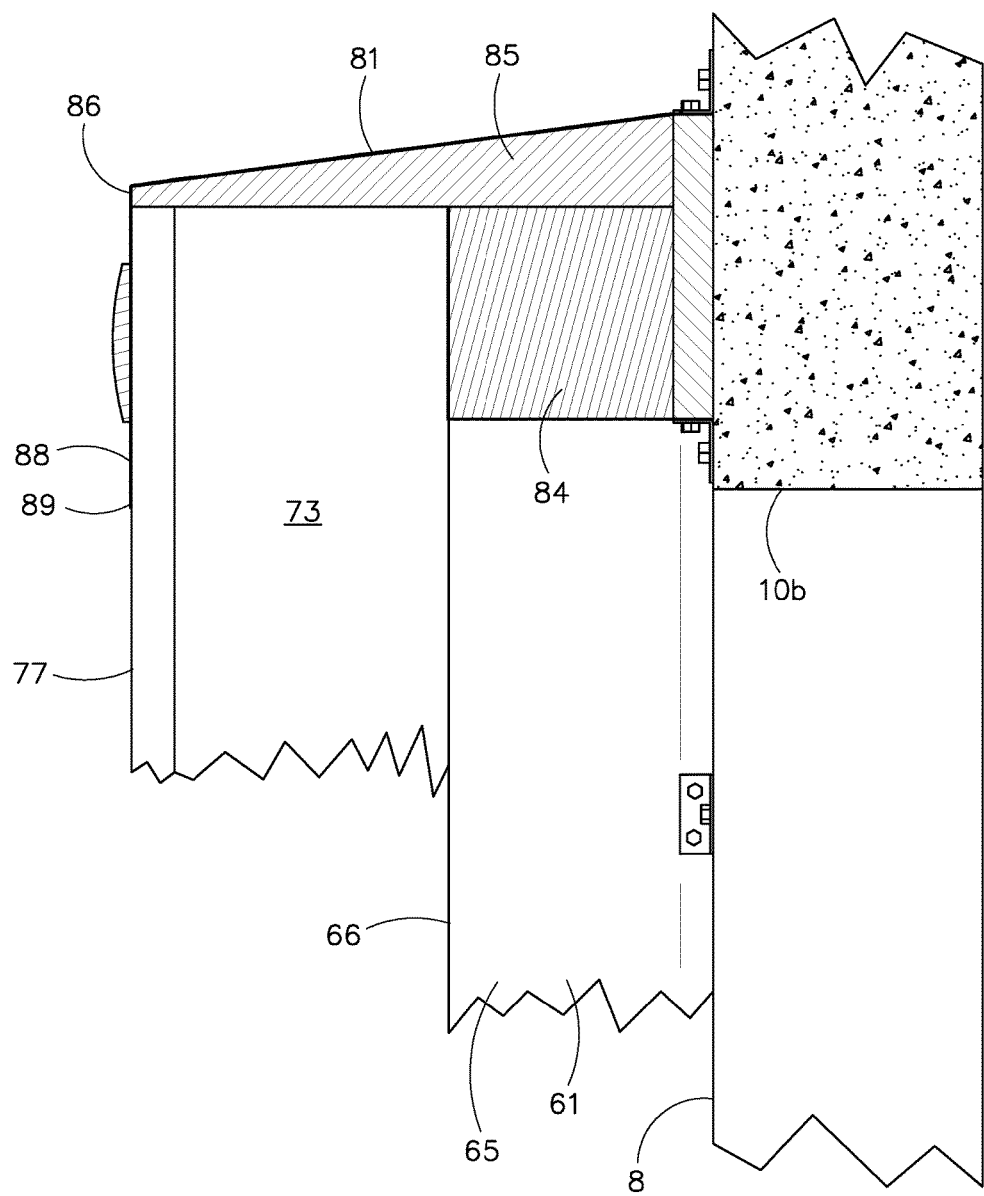

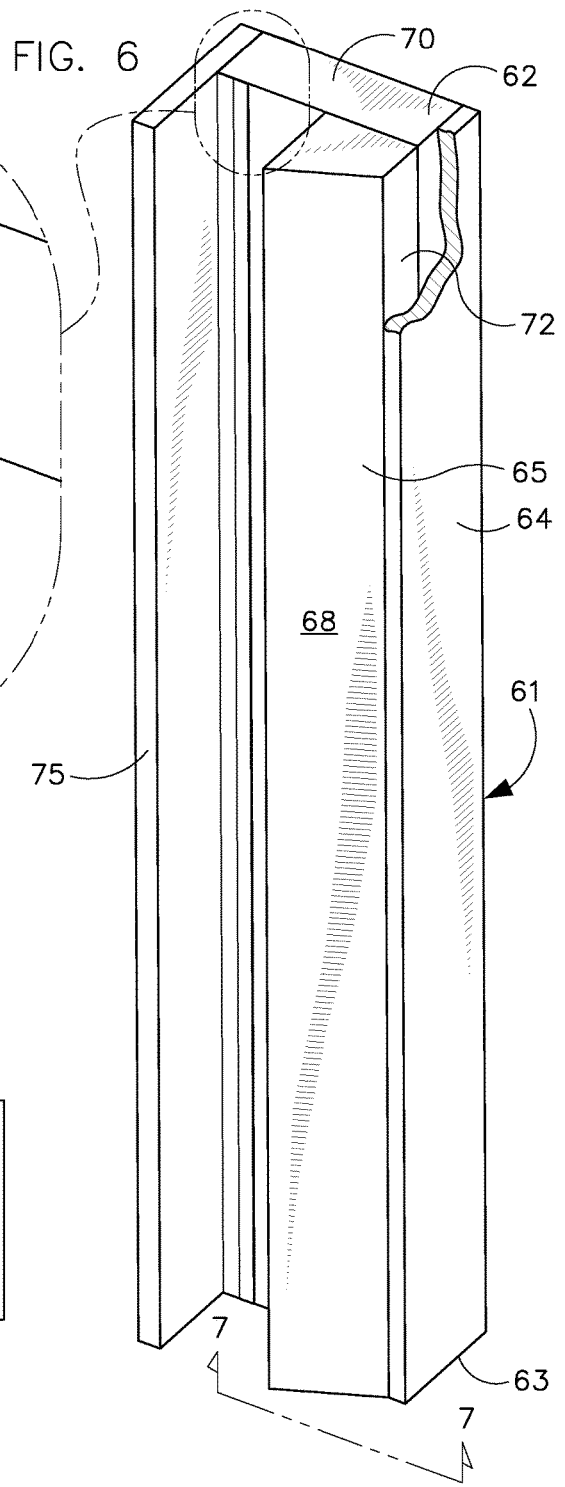
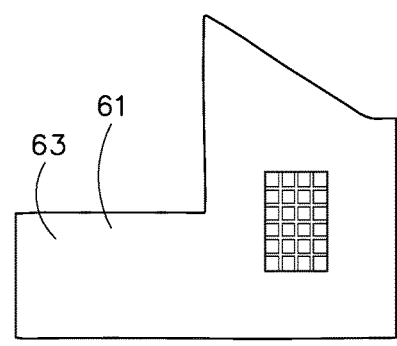
FIG. 6
FIG. 7

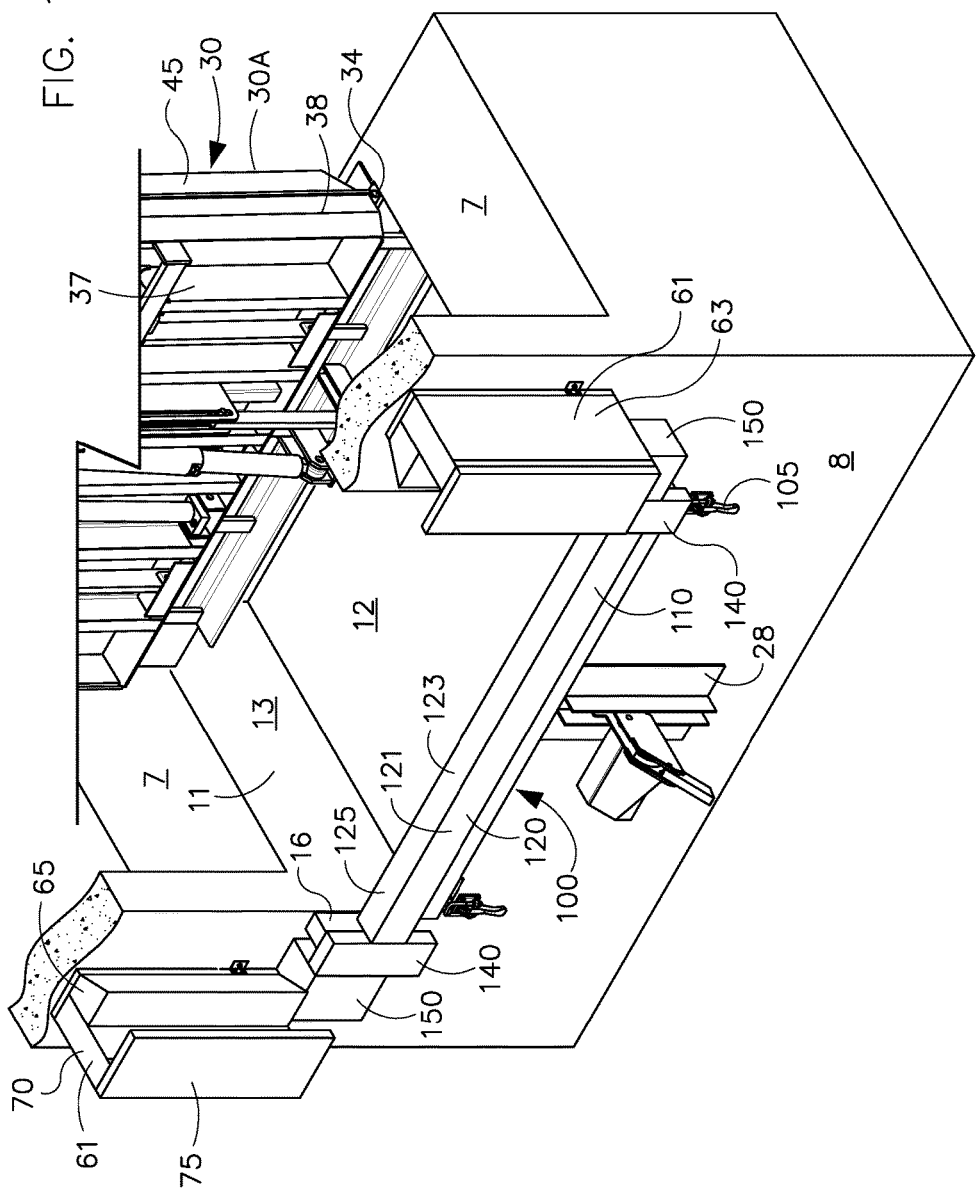

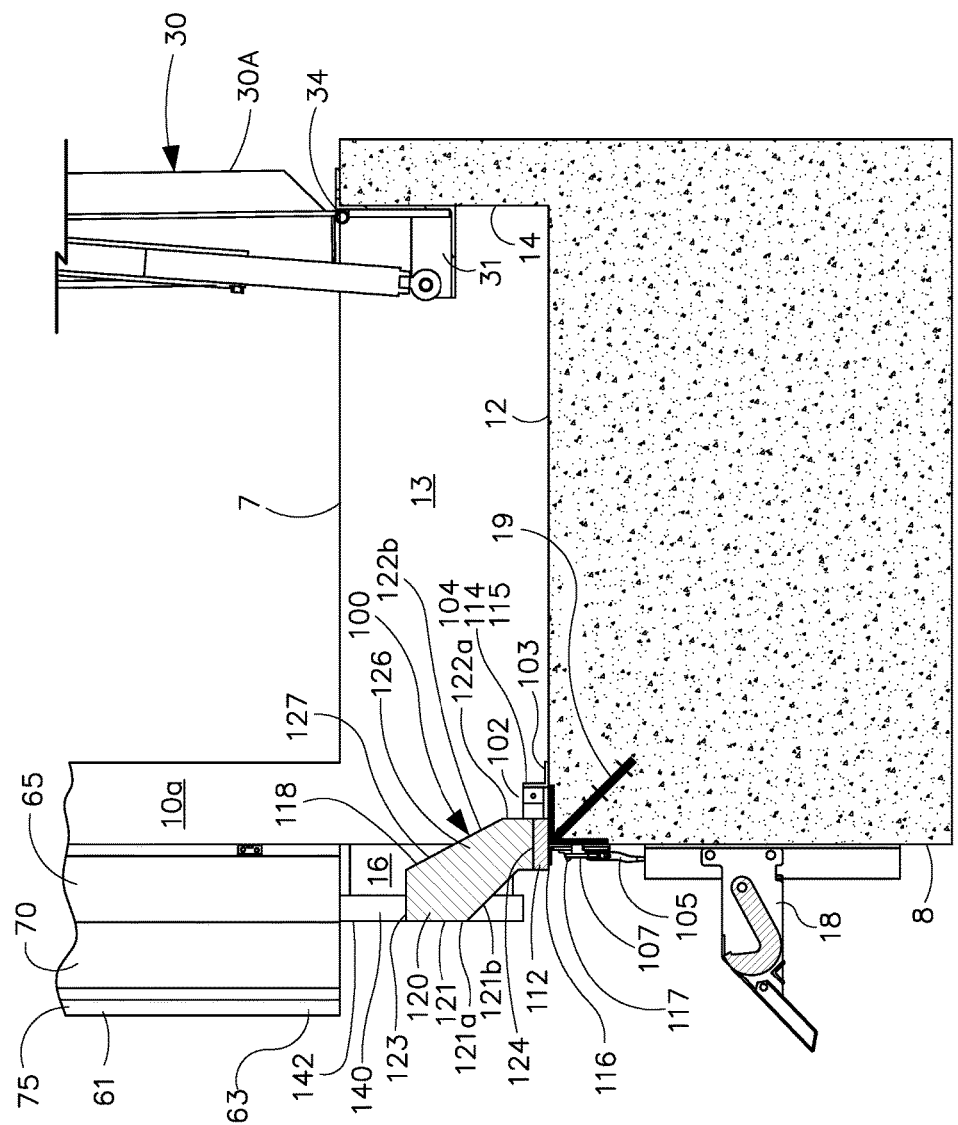

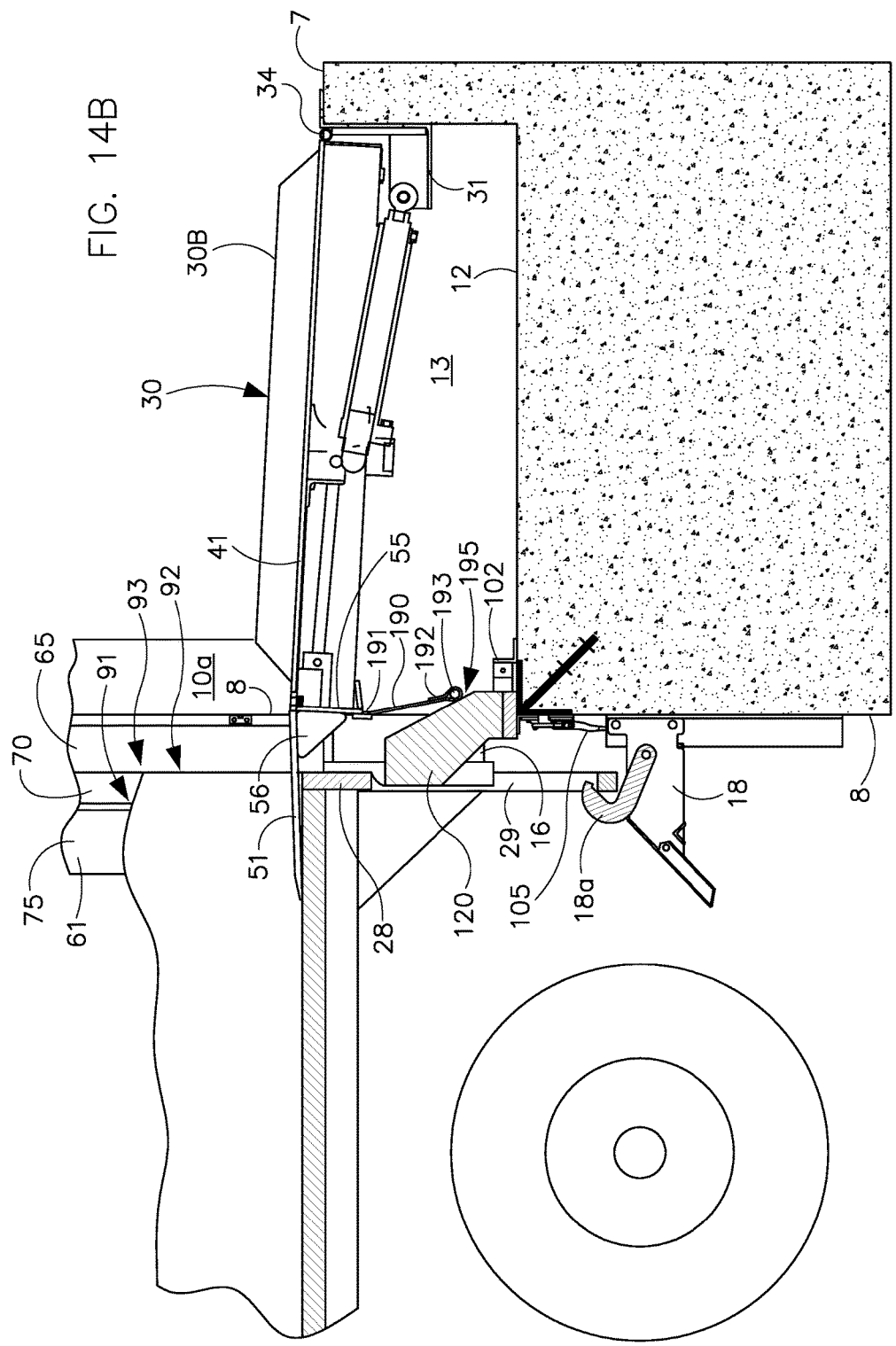

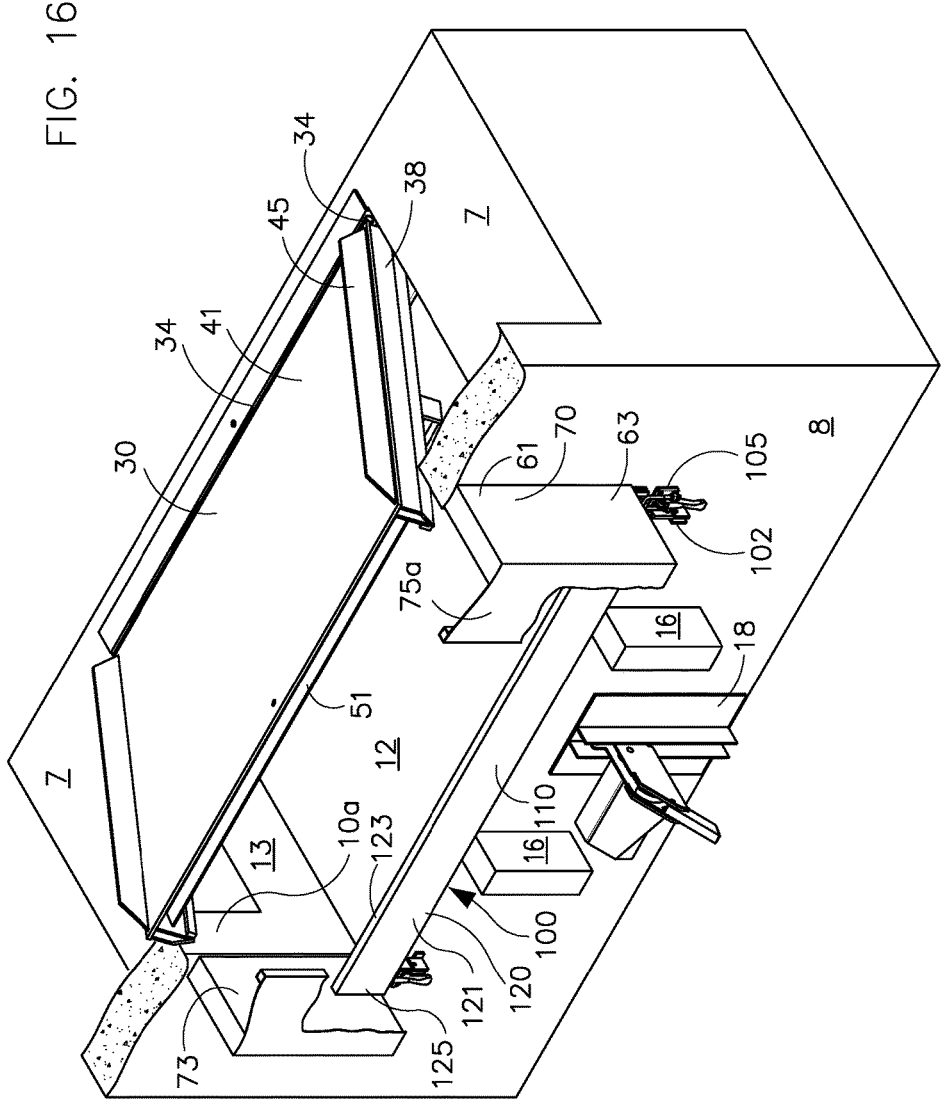

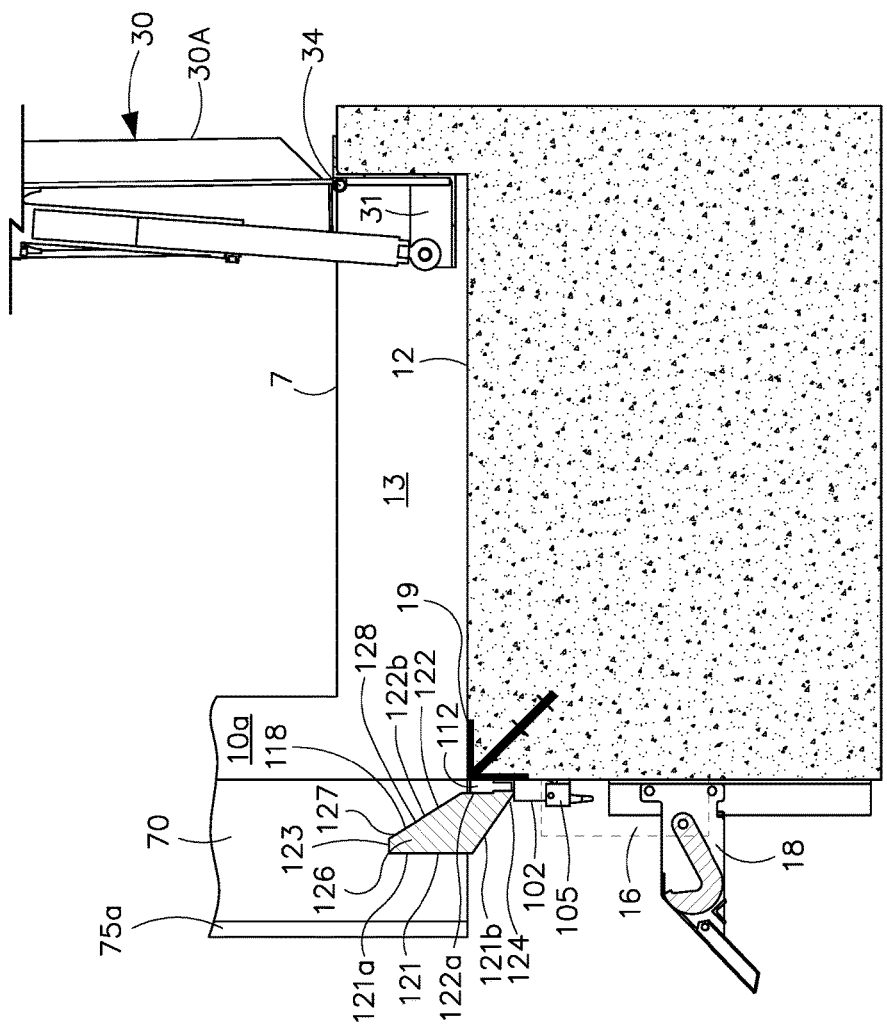

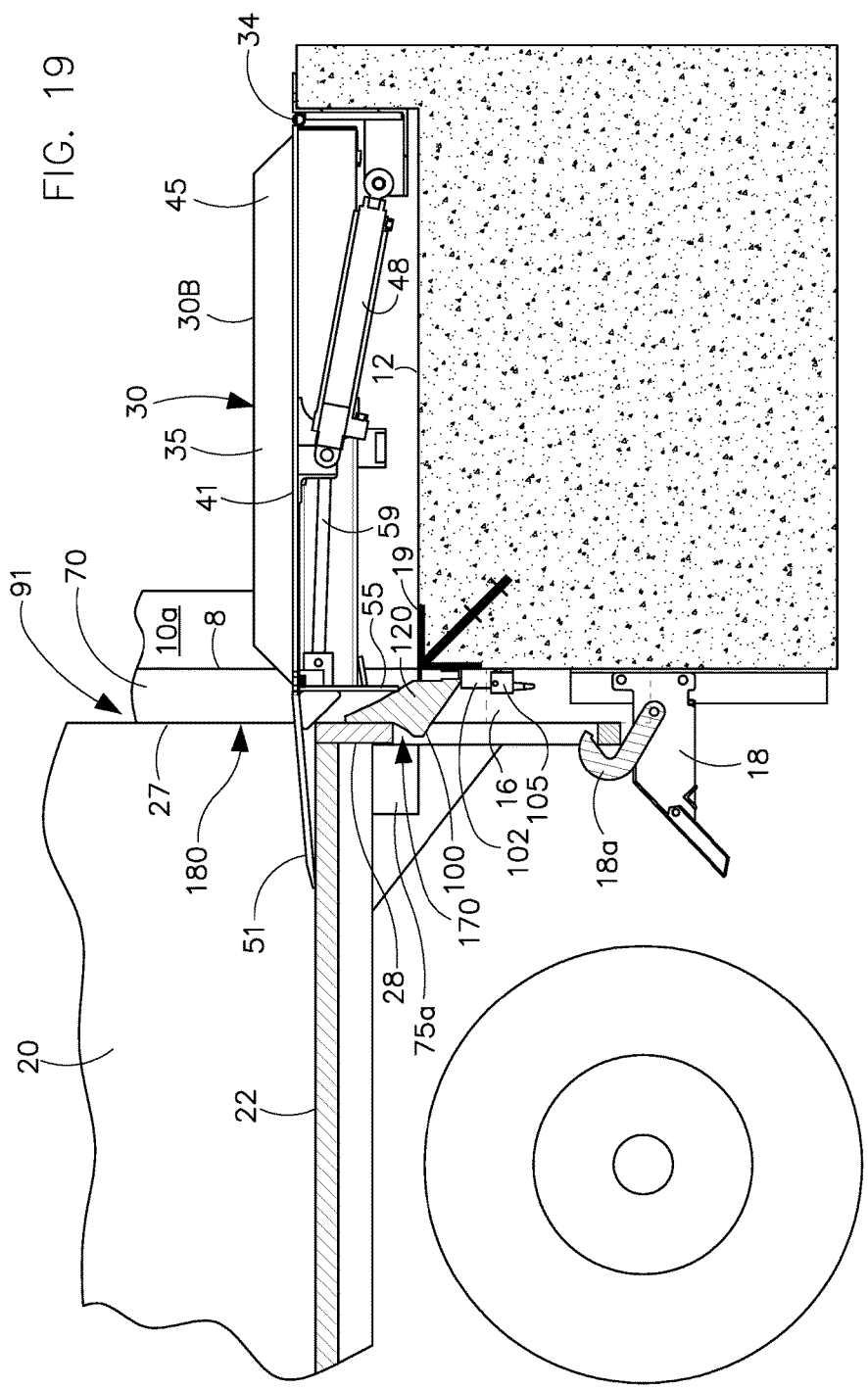

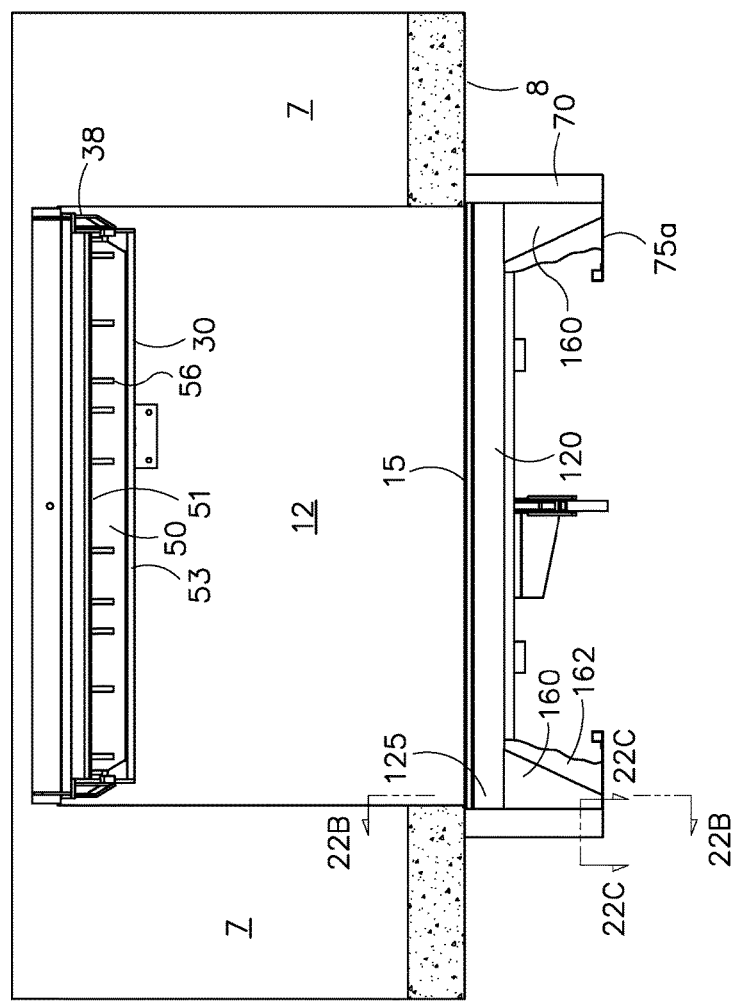

PIT SEAL AND 360-DEGREE TRAILER SEAL FOR A TELESCOPING LIP DOCK LEVELER

TECHNICAL FIELD OF THE INVENTION

This invention relates to a pivoting pit seal that seals the pit area of a loading dock equipped with a telescoping lip dock leveler that forms a continuous seal along the rear bumper of a trailer, and which combines with the side seals and top seal around the dock door opening to form a 360-degree seal around the rear end of the trailer.

BACKGROUND OF THE INVENTION

Dock seals form a weather seal between a trailer and a loading bay. Various types of dock seals have been developed and are know in the industry. Compressible seals that engage the sides and roof of the trailer are disclosed in U.S. Pat. Nos. 3,230,675; 4,213,279; 4,679,364 and 6,170,205. Inflatable or expanding seals that engage the sides and top of a trailer are described in U.S. Pat. Nos. 3,714,745; 3,939,614; 4,020,607 and 5,109,639. A loading dock shelter with side curtains mounted to side frames and a head curtain mounted to a top wall is disclosed in U.S. Pat. No. 3,403,489. A loading dock shelter with side and head curtains and compressible springs is disclosed in U.S. Pat. No. 3,826,049. A canopy with vertical side members and compressible springs and a horizontal member is disclosed in U.S. Pat. No. 4,365,452. A multi-seal dock-seal with a top seal and vertical side seals equipped with both wipe seals and compression seals is disclosed in U.S. patent application Ser. No. 15/079,021.

There are also a wide variety of pit seals. Some pit seals are located along the sides of the leveler as in U.S. Pat. Nos. 4,557,008 and 5,442,825. Pit seals help prevent weather, debris, insects and birds from entering the loading bay when the leveler is lowered to engage a trailer parked in the loading bay. When the leveler is raised, anything in the pit can be blown or otherwise make its way into the loading bay. Other pit seals are located under the leveler toward the front of the pit to prevent weather, debris, insects and birds from entering the pit. Examples of these pit seals are shown in U.S. Pat. Nos. 4,293,969; 4,422,199; 4,682,382; 6,502,268; 7,146,673; 7,594,290 and 8,006,338. They include inflatable seals, collapsing sheet seals, repositionable panel seals, hanging seals or a combination of the same.

Various problems exist with conventional loading dock pit seals. Pit seals located along the sides of the leveler have several problems. When the seals are formed by sheets of material secured to the sides of the leveler and pit wall as in U.S. Pat. No. 4,557,008, the sheets are easily pinched and sheared between the leveler and the side edges of the pit. These sheet seals are also highly impractical for vertically stored levelers. When the seals are formed by a resilient, compressible material secured along the sides of the leveler as in U.S. Pat. No. 5,442,825, the seals are pushed into and pulled out of compressed engagement with the pit edges and walls each time the leveler is raised and lowered. This forced engagement wears on and damages the seals. The greater the compressed sealing force between the seal and the pit walls the greater the wear and tear of the seal. Leveler misalignment relative to the pit walls creates an additional problem. When one side of the leveler is closer to one pit wall and the other side of the leveler is farther away from the pit wall, the result is excessive wear on one seal and an inadequate seal or gap in the seal for the other side.

Pit seals with multiple moving and fixed parts are inherently problematic. An example of such a device is shown in U.S. Pat. No. 8,006,338. This device includes rigid panels, dowels, pins, brackets, leavers, springs, extensions, rollers, mating concave and convex surfaces and weather-stripping. Binding, jamming, loosening, misalignment or breakage of any number of these components can result in an inadequate seal or complete failure of the device. An inflatable pit seal is shown in U.S. Pat. No. 4,293,969. This pit seal includes a blower motor and inflatable air bag mounted on beams extending up from the pit floor, along with straps and flaps to guide the expansion and contraction of the air bag. These seals require additional electrical wiring and are inoperable during a power outage. Many of the components forming these seals are located inside the pit, and inhibit the necessary periodic cleaning of the pit. The manufacturing, installation and maintenance costs associated with these types of pit seals renders them expensive and impractical for many loading bay installations.

Curtain seals that attach to and hang from the leveler and seal against the pit floor have additional problems. Examples of such seals are in U.S. Pat. Nos. 4,422,199 and 7,594,290. The constantly accumulating dirt and debris on the pit floor results in inadequate sealing. Adhesive or Velcro strips that secure the curtain to the floor lose their holding strength and become ineffective. When the leveler is lowered and the curtain folds or collapses, it can extend forward and be pinched and damaged between the front of the leveler and the pit floor. Structures to ensure the curtain folds rearwardly are awkward to install and negotiate when cleaning the pit. Rigid hanging structures pose injury risks to the persons cleaning the pit or servicing the leveler.

The present invention is intended to solve these and other problems.

BRIEF DESCRIPTION OF THE INVENTION

The present invention pertains to a pivoting pit seal assembly that forms a continuous seal with the rear bumper of a trailer parked in the bay of a loading dock, and which combines with the side and top seals of the loading dock to provide a 360-degree seal around a trailer. The pit seal assembly has a compression pad mounted to a rigid base. The pad has a resilient, compressible core material wrapped by a durable cover. One side of the base is pivotally held by brackets and corresponding releasable latches anchored to the front wall adjacent the pit floor or directly to the pit floor. During use, the pit seal is held in an upright or upwardly and forwardly angled trailer engaging position to compressingly engage the rear bumper of the trailer and form a continuous seal with the bumper. Each side end of the pit seal sealingly engages the vertical side seals located along the sides of the door opening to form a continuous seal between the pit seal and the side seals. To clean or access the pit, the releasable fastener is unfastened and the pit seal is rotated to a reclined position.

An advantage of the pivoting pit seal is that it readily accommodates a wide range of pit heights. For deeper pits, the anchor brackets are secured to the pit floor proximal the front wall. The pit seal rotates backward into a slightly raised recline position inside the pit to facilitate cleaning. The base of the pit seal lays flat against the pit floor during normal operation and projects outward from the pit and front wall. The fastening clamps are secured to the front wall immediately below and in registry with the anchor brackets to selectively secure and releasably engage the base of the pit seal. For shallower pits, the anchor brackets are secured to the front wall proximal to and on the sides of the pit floor. The base of the pit seal lays flat against the front wall and projects slightly upward from the pit floor. The fastening clamps are secured to the front wall immediately above and outwardly from the anchor brackets to selectively secure and releasably engage the pit seal base. In both embodiments, the main body of the pit seal is shaped to angularly extend outward from the pit with its front surface located in front of the front wall of the loading dock, so that the tail end of the trailer compressingly engages the pit seal when its rear bumper or ICC bar engages the building bumpers on the front wall of the building. In both embodiments, the main body of the pit seal extends upward from the pit floor to a height roughly about eight inches below the dock floor of the loading dock.

Another advantage of the pivoting pit seal is its seal reliability. The pit is properly and reliably sealed when the tail end of the trailer presses into the front surface of the main body of the pit seal. The compression seal is completely passive during use and has no moving parts that can bind, jam, loosen, misalign or break to prevent a proper seal.

A further advantage of the pivoting pit seal is that it matingly seals with conventional side seals located along the dock door opening. The pit seal and side seals form a continuous seal along the bottom and sides of the trailer, and when combined with a top seal, form a continuous 360 degree seal around the perimeter of the dock door and the rear end of the trailer. For loading bays with bumpers located above and to the sides of the pit floor, additional compression pads are installed to sealingly mate with the side ends of the pit seal and extend the pit seal to the side seals along the vertical sides of the dock door opening.

A still further advantage of the pivoting pit seal is its ease of use to gain access into and clean the pit. The fastening latches are released and the pit seal is pivotally rotated about its anchor brackets to its reclined position. For the shallower pit embodiment, there are no pit seal components inside the pit to obstruct or inadvertently injure the worker when servicing of the leveler or cleaning of the pit. For the deeper pit embodiment, the base and anchor bracket combine to elevate the pit seal off the pit floor to facilitate cleaning. While the body of the pit seal remains in the pit, its compressible pad faces the worker to help avoid inadvertent injury.

A still further advantage of the pivoting pit seal is its ability to withstand wind loads. The base plate rigidly secures the pit seal to the building pit or wall, and positions the compression pad in an upright or upwardly angled trailer engaging position. The pit seal has sufficient rigidity to resist wind loads. The pit seal remains in an upright or upwardly angled position when the trailer is backing into the loading bay even on windy or gusty days. The pit seal is free to flex inwardly when engaged by the trailer, but is supported by the rigid base plate, the stiffness of the compressible pad and abutting engagement of the pad with the lip header to prevent the wind from dislodging the pit seal from the trailer bumper.

A still further advantage of the pivoting pit seal is the height of its trailer engaging forward surface. The large height of the forward surface of the pit seal is sufficiently large to accommodate a variety of trailer bumper heights.

A still further advantage of the pivoting pit seal is its ability to accommodate height adjustments of the trailer when cargo is loaded and unloaded. Although the pit seal pad is compressed by the tail end of a trailer during use, the pit seal is not pinched between the tail end of the trailer and the lip lugs and header. The main body and cover of the pit seal allows the trailer to move up and down during loading and unloading without damaging the pit seal.

A still further advantage of the multi-seal dock seal is that it is primarily constructed of flexible components. Other than the base plate and brackets that remain recessed from the bumpers during use, the pit seal is constructed of flexible components that extend outwardly from the front wall and its bumpers. A truck or trailer that is not properly centered or aligned with the front wall of the building when it backs into the loading bay will contact flexible structures to help avoid damage to the trailer as well as the pit seal itself.

Other aspects and advantages of the invention will become apparent upon making reference to the specification, claims and drawings.

BRIEF DESCRIPTION OF THE DRAWINGS

FIG. 2A is a front view of the multi-seal dock seal installed around the top and sides of a loading bay door opening with alignment strips to visually guide a trailer into the bay and wear flaps to provide extra protection from engagement with the trailer.

FIG. 5C is a cross-sectional view showing the top seal assembly in a normal non-engaged position when no trailer is parked in the loading dock bay.

FIG. 6 is a perspective view of the side seal assembly of the multi-seal, with a detail showing a Velcro strip securing the side wipe pad to the forward extending pad.

FIG. 7 is a bottom view of the side seal assembly showing a vent on its lower surface.

FIG. 11 is a perspective view of a loading bay having a deeper pit, a vehicle restraint anchored to the front wall, building bumpers located to the sides of the pit and above the pit floor, and the pit being equipped with the first embodiment of the pit seal assembly including a pit seal with a central compression pad, bumper pads and outer gap pads, where each side end of the central compression pad snuggly and sealingly engages its adjacent compressible bumper pad placed over the building bumper, each bumper pad snuggly and sealingly engages its adjacent compressible gap pad, and the top of the gap pad snuggly and sealingly engaging the lower end of its adjacent vertical side seal extending along the side of the door opening.

FIG. 13A is a side sectional view showing the pit seal assembly with its pivotal central compression pad and fixed compressible bumper pad in their normal, non-compressed condition, and showing the vertical side seal in its normal, non-compressed condition.

FIG. 14B is a side sectional view showing a trailer parked in the loading bay and the pit seal assembly with the central compression pad disengaged from the rear bumper of the trailer, the bumper pad compressed by the rear bumper of a trailer, and the leveler in a lowered position with the lip engaging the trailer bed and a curtain secured to the lip header and hanging down into sealing engagement with the angled rear surface of the compression pad to form a seal along the width of the pit and rear end of the trailer.

FIG. 16 is a perspective view of a loading bay having a shallower pit, a vehicle restraint anchored to the front wall and building bumpers located below the pit floor, and the pit being equipped with a second embodiment of the pit seal assembly with the pit seal and its central compression pad extending across the width of the pit, and with a portion of the side seals cut away to show each side end of the pit seal snuggly and sealingly engaging the bottom end of a side seal pads extending outwardly from the front wall and upwardly along the vertical side of the door opening.

FIG. 18A is a side sectional view showing the pit seal assembly with its pivotal central compression pad and fixed compressible bumper pad in their normal, non-compressed condition, and showing the vertical side seal in its normal, non-compressed condition.

FIG. 19 is a side sectional view showing a trailer parked in the loading bay and the compression pad of the pit seal assembly compressed by the rear bumper of a trailer, and the leveler lowered with the lip engaging the bed of the trailer.

FIG. 22A is a top view showing the second embodiment of the pit seal assembly with draft pads secured to the bottoms of the vertical side seals.

DESCRIPTION OF THE PREFERRED EMBODIMENTS

While this invention is susceptible to embodiments in many different forms, the drawings show and the specification describes in detail preferred embodiments of the invention. It should be understood that the drawings and specification are to be considered an exemplification of the principles of the invention. They are not intended to limit the broad aspects of the invention to the embodiments illustrated.

Figure 1A:
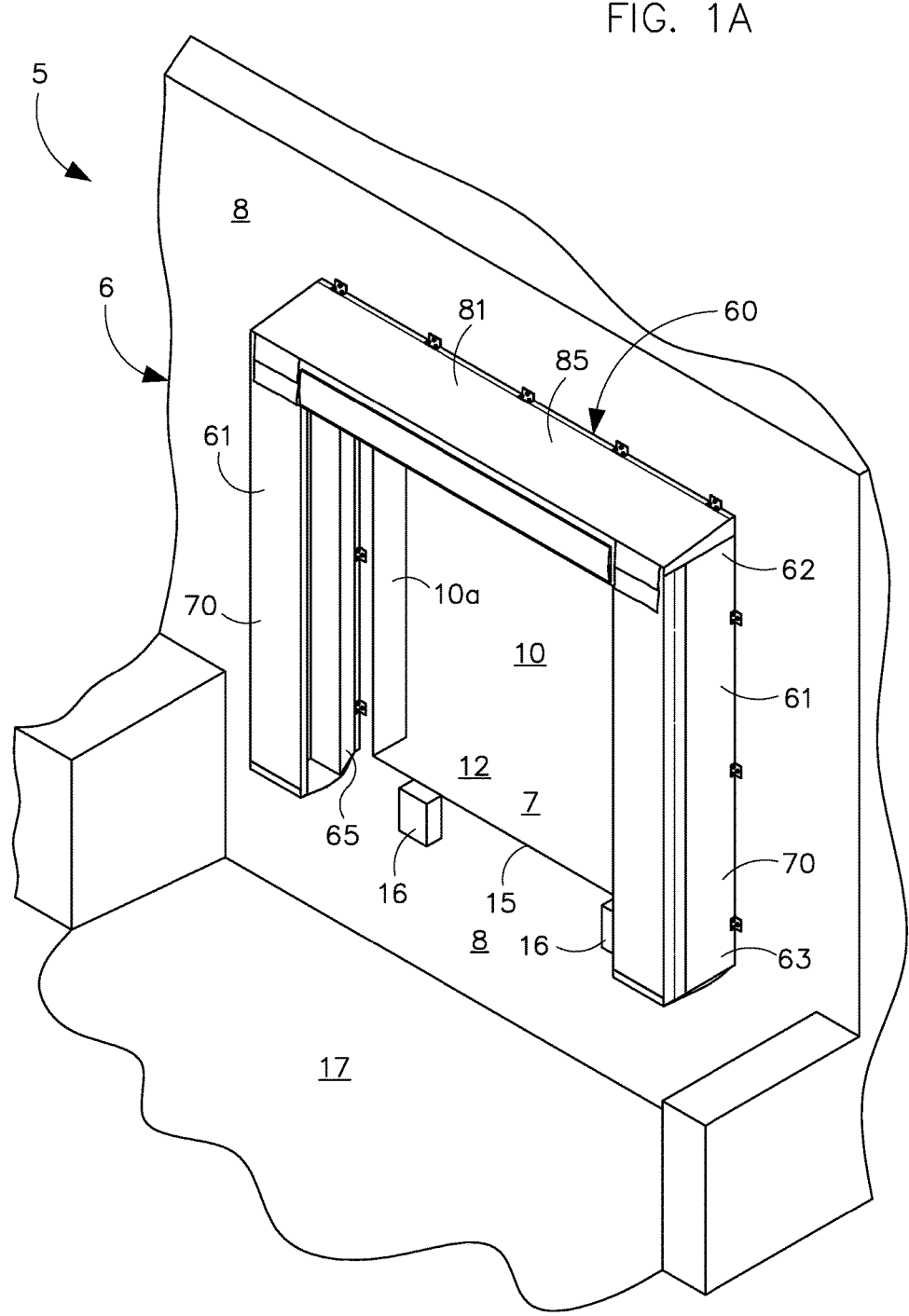
FIG. 1A is a perspective view of the multi-seal dock seal installed around the loading bay door opening of a loading dock building.

Modern commercial buildings 5 for manufacturing, warehousing, distributing and selling goods are equipped with loading docks or bays 6 to efficiently move goods, supplies, furniture, equipment and other forms of cargo in and out of the building. The loading docks 6 have a generally flat, horizontal, elevated floor surface 7 that extends from a generally vertical and planar exterior front wall 8 into the interior 9 of the building 5 as shown in FIG. 1A. The loading bay 6 has an elevated doorway 10 defined by its sides 10a, top 10b and pit floor 12. A door such as an overhead door is used to selectively open and close the doorway opening 10. The overhead door seals the doorway 10 when the dock is not in use, and is opened when a trailer backs up to the dock 6 to load or unload cargo. The loading bay 6 includes a pit 11 with a floor 12, side walls 13, rear wall 14 and an open front end. The front wall 8 includes laterally spaced bumpers 16 fixed to the wall 8 at a height suitable to engage a trailer when it backs into the dock or bay 6. The distance the bumpers 16 extend or project out from the wall 8 varies from building-to-building, but is typically between about 4 to 10 inches, and is commonly 6 inches. The front wall 8 extends from the paved drive or ground surface 17 up to the elevated dock floor 7. In refrigerated warehouse environments, such as for food processing and storage, this wall 8 extends further up to enclose the interior 9 of the building 5 and bay 6. The dock 6 can be equipped with conventional trailer restraint 18 with a selectively extendable and retractable hook 18a. The front edge of the pit 11 has an angle iron 19 that spans the width of the pit 11. The angle iron 19 is embedded in and anchored to the concrete forming the front wall 8 and pit 11.

Figure 3:
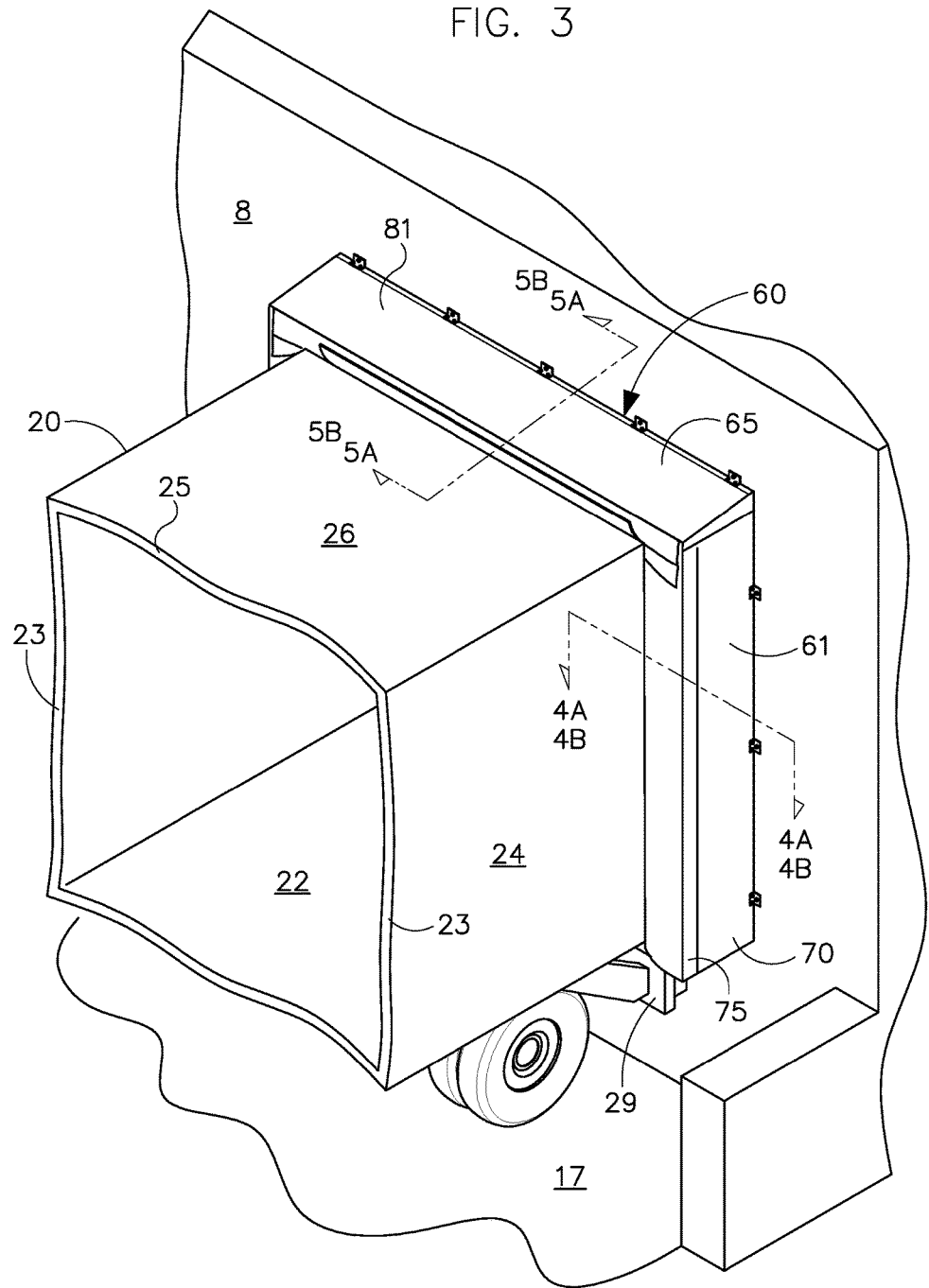
FIG. 3 is a perspective view of the multi-seal dock seal installed around the loading bay door opening with a trailer backed into the bay and sealingly engaging the multi-seal to form a continuous weather seal around the sides and top of the trailer.

The loading dock 6 is designed to facilitate access to a trailer 20 of a truck or other carrier as shown in FIG. 3. The trailer or container 20 has an elevated bed 22 for placing cargo. The trailer or container 20 also has side walls 23 with flat outer surfaces 24 and a roof 25 with a generally flat top surface 26 that form the exterior of the trailer. The rear end 27 of the trailer 20 has a bumper 28 located proximal to and immediately below the trailer bed 22, and an ICC bar 29 located a significant distance below the trailer bed 22 to engage the bumpers 16 of the loading bay 6. The wheels of the trailer travel on the driveway or approach 17 adjacent the loading dock 6. The dock floor 7 is elevated a desired distance above the adjacent driveway 17 so that the trailer bed 22 is somewhat near the level of the dock floor 7 when trailer 20 backs up to the dock 6.

The height of the trailer bed 22 and roof 25 relative to the driveway 17, dock floor 7 and opening 10 depends on a variety of factors. These factors include the particular trailer or container 20 involved and the weight of the cargo on the trailer or container 20. The heights of the trailer bed 22 and its roof surface 26 rise and fall relative to the dock floor 7 and opening 10 as cargo items are placed on or removed from the trailer 20. Typically, the top surface 26 of a trailer 20 has a height ranging from 12 feet (144 inches) to 13 feet, 6 inch (162 inches) above the ground 17. While the present invention is described with reference to a trailer or container 20, it should be understood that various types of cargo transport devices can be substituted without departing from the broader aspects of the invention.

The loading dock 6 includes a telescoping lip dock leveler 30 mounted in the pit 11. For refrigerated buildings 5, the leveler 30 is preferably a vertically-stored, telescoping-lip, dock leveler as in U.S. Pat. No. 9,517,902 and shown in FIGS. 11-22. The leveler 30 has a variety of components including a mounting frame assembly 31, a deck and lip assembly 35 with a telescoping lip assembly 50, and deck and lip positioning mechanisms 48 and 59. The components are robustly designed to support the weight of the deck and lip assembly 35 and the loads it is intended to carry when forklifts and the like carry cargo over the leveler 30.

The mounting frame assembly 31 is located along the floor 12 and rear wall 14 of the pit 11. The frame assembly 31 has a rear end, and includes a base frame that is bolted or otherwise rigidly anchored to the pit floor 12, and a vertical riser frame that is similarly anchored to the pit rear wall 14. The base frame spans the majority of the width of the pit 11. The riser frame is located along the pit rear wall 14, and is preferably welded or otherwise rigidly secured to the rear end of the base frame. The riser frame includes two or more vertical beams joined together by lower and upper mounting channels. The upper mounting channel is aligned against and anchored to one or both of the top of the pit rear wall 14 and the dock floor 7. The riser is rigidly secured to the upper mount to firmly support a fixed tubular hinge or pivot mount 34 for pivotally supporting the deck and lip assembly 35. A pivot bracket extends forward from the base frame to supportably receive a hydraulic deck drive cylinder spaced a predetermined distance from the rear wall 14 of the pit 11. The mounting frame 31 is preferably permanently attached to case in steel in the building floor at its rear pivot end.

The deck and lip assembly 35 includes a deck assembly and a telescoping lip assembly 50 as best shown in FIGS. 14 and 19. The deck assembly includes a deck frame 37, deck 41 and lip 51 support carriage. The entire deck and lip assembly 35 is movable through a range of inclined positions as discussed below. The deck support frame 37 has six relatively evenly spaced, parallel beams and side plates 38 that are welded or otherwise rigidly joined together by a rear plate. The deck support beams extend forward about ⅔ the length of the deck 40 to the rear end of a lip retaining area. The beams do not extend into the lip retaining area. The front end of each beam is welded or otherwise rigidly secured to the underside of the deck 40 via two gussets. The top of the outside or rear surface of the rear plate is firmly and pivotally secured to the hinge 34 at the top of the support frame risers and upper mounting channel. The side plates 38 include a pinch guard.

The deck 40 is preferably formed from a sheet or plate of metal 41. The deck plate 41 has a predetermined length of preferably about 5 to 7 feet between its parallel rear and front ends. The deck plate 41 has a predetermined width, and a thickness defined by its parallel lower and upper surfaces. The lower surface is welded or otherwise rigidly secured to the deck frame 37, and its upper surface is generally flat and free and clear of obstructions. Side guards 45 are fixed to the sides of the deck plate 41. The deck and lip assembly 35 is pivotally secured to hinge 34 so that the upper surface of the deck plate 41 is aligned parallel to the dock floor 7 when the deck 40 is lowered.

The lip carriage 46 includes two support and guide rails. One rail is secured to the inside surface of each side plate 38 of the deck frame 37. Each elongated rail has a generally linear shape and is about two feet long. The rails have a uniform rectangular cross-sectional shape along their length to provide flat upper and inner surfaces. The upper surface of each rail is uniformly spaced downwardly from and roughly parallel to the deck plate 41. The carriage assembly 46 also includes two guide tracks. Each guide track or roller trap extends forward from the rear header plate. Its rear end is bolted to the rear plate, and its front end is bolted to a bracket welded to the underside of the deck plate 41.

The telescoping lip assembly 50 has a lip plate 51, header plate 55 and lugs 56. The lip plate 51 has a generally rectangular shape. Its length is defined by its inner end and outer free end 52. Its width is defined by its parallel side edges. The side edges of the lip plate 51 are in substantial registry or alignment with the side edge of the deck 40, and are received between and slightly inwardly offset from the side plates 38 of the deck frame 37. The lip plate 51 has a predetermined thickness defined by its generally parallel lower and upper surfaces. The upper surface of the free end 52 is beveled or slightly sloped toward the lower surface. The inner end of the lip plate 51 is joined to the top of its headboard or header plate 55. This connection is strengthened by a number of lugs 56 welded to the lower surface of the lip plate 51 and front of its header plate 55. The header plate 55 is held substantially perpendicular to the deck plate 41. The lugs 56 hold the lip plate 51 at an 85° angle relative to its header plate 55, so that the lip plate is at a 5° downward angle relative to the deck plate 51. This slight downward sloped facilitates engagement with a trailer bed 22 when the trailer bed is elevated slightly above the dock floor 7.

The lip assembly 50 has guide and support components to telescopically join it to the deck frame 37 and support carriage 46 to allow its linear movement. These guide and support components include two sets of lip guide beams. One set of guide beams is located on each side of the deck 40. Each set of beams straddle one of the lip guide tracks of the lip support and guide carriage 46. The guide tracks and beams are linearly aligned. The lip guide and support components include several rollers to movingly support and smoothly guide the telescoping lip assembly 50. Weight-bearing rollers ride on the guide rails to movingly support the majority of the weight of the lip assembly 50, and transfer that weight to the deck frame 37 via the guide rails of the support carriage 46. Alignment rollers maintain the registered alignment of the lip plate 51 with the deck plate 41. Yoke rollers ride on the upper surface of the guide track to help movingly support the weight of the lip assembly 50. The guide and support components are telescopically secured to the deck frame 37 by the support carriage 46. The lip guide and support components allow the lip assembly 50 and lip plate 51 to move along a substantially linear path of travel between a retracted position and a fully extended position. When fully extended, the rear end of the lip plate 51 is just forward of the front end of the deck plate 41. The lip assembly 50 and lip plate 51 are also movable to any desired partially extended position through a continuous range of partially extended positions, such as for end loading of a trailer. When in its retracted or stored position as in FIGS. 15, 16 and 20, the free end 52 of the lip plate 51 is in substantial registry with the front end of the deck plate 41.

The deck positioning mechanism 48 selectively raises and lowers the deck and lip assembly 35 through a range of positions. The deck positioning mechanism 48 is preferably hydraulic, and includes a conventional drive cylinder drive rod and hydraulic pump. One end of the hydraulic cylinder is pivotally pinned to a bracket welded to the underside of the deck plate 41. The drive rod is pinned to the mounting bracket of the base frame 31. The cylinder extends and retracts its drive rod to selectively rotate the deck and lip assembly 35 through its incline positions by pivoting it up or down about hinge 34. During operation, the deck positioning mechanism 48 sequentially moves the deck and lip assembly 35 from a vertically stored position 30A as in FIGS. 15 and 20, down to a partially lowered lip extending position as in FIGS. 16 and 19, and further down into engagement with the trailer bed 22 through a range of trailer engaging positions 30B as in FIGS. 14A-B.

The lip extension mechanism 59 extends and retracts the lip assembly and lip 51 when the leveler 30 reaches a preset angular position as shown in FIG. 16. The lip extension mechanism 59 is preferably hydraulic, and includes a drive cylinder and drive rod. The mechanism 59 shares the hydraulic pump of the deck positioning mechanism 48. The lip drive rod has a predetermined length of about two feet. One end of the hydraulic cylinder is pivotally pinned to a bracket secured to the rear header of the deck frame. The drive rod is pinned to a bracket secured to the header 55 of the lip assembly 50. When the lip drive 59 is engaged, the lip drive rod pushes or pulls the lip assembly 50 along its linear path of travel into its retracted, fully extended or partially extended positions.

The loading bay 6 has a continuous dock seal 60 extending around the sides and top of the door opening 10. The dock seal 60 includes two side seal assemblies 61 spanning the height of the door opening 10 and a top seal assembly 81 spanning the width of the door opening. Each side seal assembly 61 includes an extension pad 70 and wipe pad 75 to form a wipe seal 91 as in FIGS. 18-23. Each side seal assembly 61 can also include an optional compression pad 65, so that the side seal assemblies 61 form both a wipe seal 91 and a compression seal 92, which combine to form a multi-seal 93. The continuous dock seal 60 includes a conventional rigid header frame and curtain 80 as in FIG. 9, or a cooperating custom fit top seal assembly 81 as in FIGS. 1A-B, 3 and 5A-C. Each side seal assembly 61 has top and bottom ends 62 and 63, and extends vertically along the full height of the vertical side 10a of the dock door opening 10. The conventional rigid header frame and curtain 80 or top seal assembly 81 has side ends 82, and extends the full width of the horizontal top 10b of the opening 10.

Figure 1B:
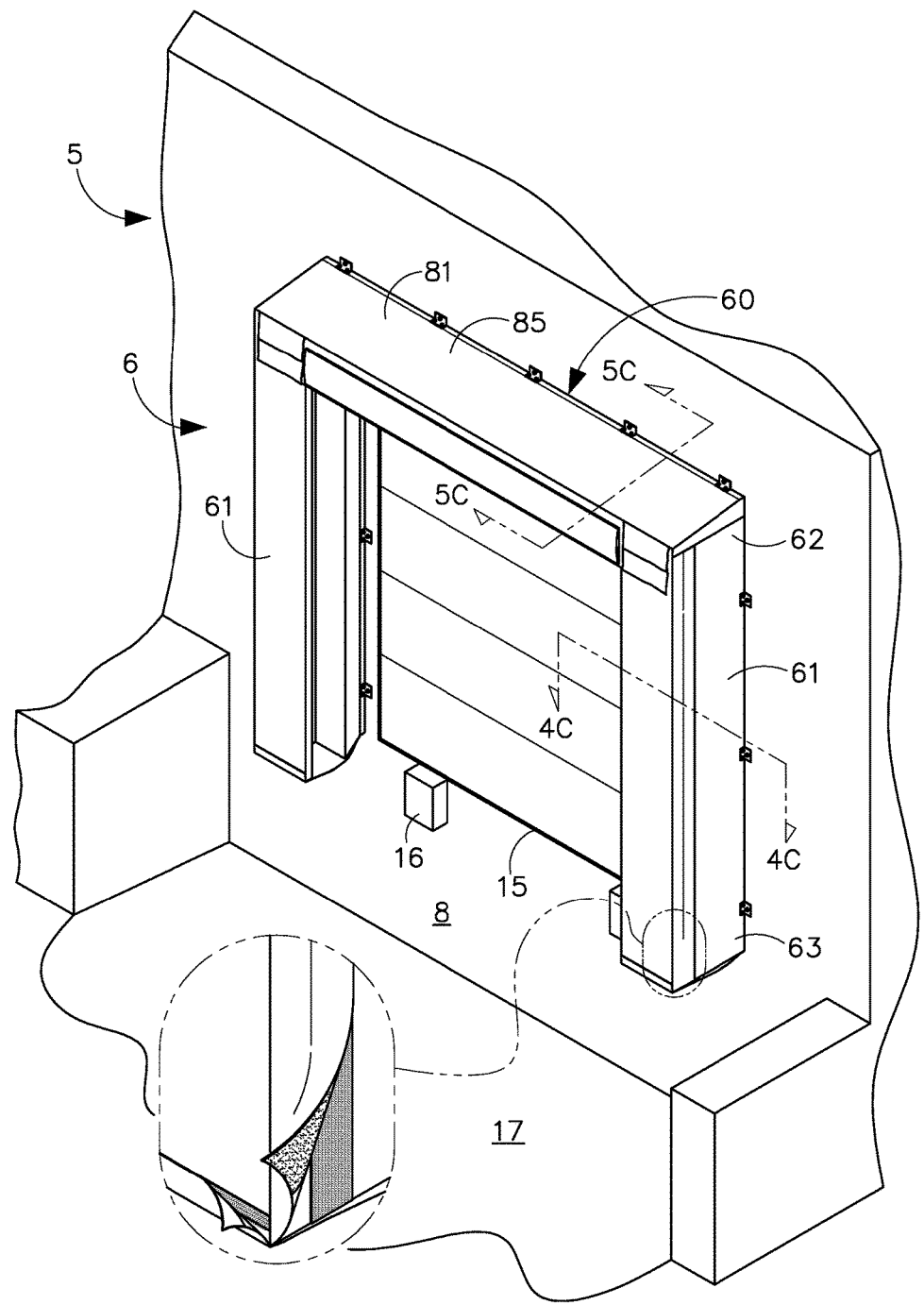
FIG. 1B is a perspective view of a second embodiment of the multi-seal dock seal installed around the loading bay door opening of a loading dock building, and with a detail showing a Velcro strip securing the side wipe pad to the forward extending pad and a Velcro strip securing a side stabilizing strip to the bottom of the side wipe pad.

As shown in FIGS. 4A-C and 6, each side seal assembly 61 has a rigid backing plate 64 and three compression type foam pads 65, 70 and 75, with the pad 65 being optional. The backing plate or member 64 is bolted or otherwise rigidly secured to the outer wall 8 of the building 5 as shown in FIGS. 1A-B. This plate 64 spans the height of loading bay opening 10, and is about two inches thick and ten inches wide. The plate 64 is preferably made of wood, steal or rigid plastic, and is robustly designed to prevent warping, cracking or other deformation during use. Each backing plate 64 is installed with its inside edge offset a uniform distance of about two inches from the side edge 10a of the bay opening 10.

The optional first flexible component or compression pad 65 spans the height of the bay opening 10, and is glued or otherwise firmly secured to the backing plate 64 along that entire distance. The pad 65 has a non-compressed, trapezoidal, cross-sectional shape as best show in FIGS. 4B-C and 6. The front and rear surfaces 66 and 67 of the pad 65 define its non-compressed thickness of about ten inches extending away from the building wall 8. The side surfaces 68 and 69 of the pad 65 define its width. The width along its rear or fixed base surface 67 is about three inches. This width increases to about nine inches along its compressible front or outer trailer engaging surface 66. The front surface 66 of each trapezoidal shaped compression pad 65 extends into the bay opening 10 about four inches. The pad 65 has an interior that is formed by compression type foam, and is preferably open cell polyurethane foam with a density of about 1.2 pounds per cubic foot and an ILD of about 28-36 lbs/50 sq.in., a tensile strength of about 12 lbs/foot, a tear strength of about 1.2 lbs/in. and memory to resiliently return to its original shape when the trailer 20 pulls away and the foam is not compressed.

The second flexible component or forward extension pad 70 spans the height of the bay opening 10, and is also glued or otherwise firmly secured to the backing plate 64 along that distance. The pad 70 has a rectangular cross-sectional shape as best shown in FIGS. 4A-C and 6. The length of the extension pad 70 is defined by its front and rear surfaces 71 and 72. The pad length extends a distance of about two feet from the building wall 8. The side surfaces 73 define the width of the extension pad 70. This uniform width is about seven inches. The extension pad 70 has an interior that is formed by a compression type foam, and is preferably an open cell polyurethane foam with a density of about 2 lbs/cubic foot, an ILD of about 90-110 lbs/50 sq.in., a tensile strength of about 12 lbs/foot, a tear strength of about 1.2 lbs/in., and memory to resiliently return to its original shape when the trailer 20 pulls away and the foam is not compressed or flexed.

The extension pad 70 is positioned in abutting engagement with and radially outward from the compression seal 65 relative to the door opening 10. The inner side 73 of the extension pad 70 flushly engages the outside surface 69 of the compression pad 65, and the pads 65 and 70 are glued together to provide additional lateral strength and stability to the extension pad 70. The compression and extension pads 65 and 70 are also wrapped in a single durable vinyl covering to form a single or integral structure to further provide strength and stability to the extension pad 70. The vinyl covering is preferably a PVC vinyl coated polyester having a weight of about 22 to 50 ounces per square yard. The cover has flap portion that extends to cover and hide the backing 64 when installed. A vent is located on the bottom of the wrapped compression pad 65 and extension pad 70 structure as shown in FIG. 7.

Figure 2B:
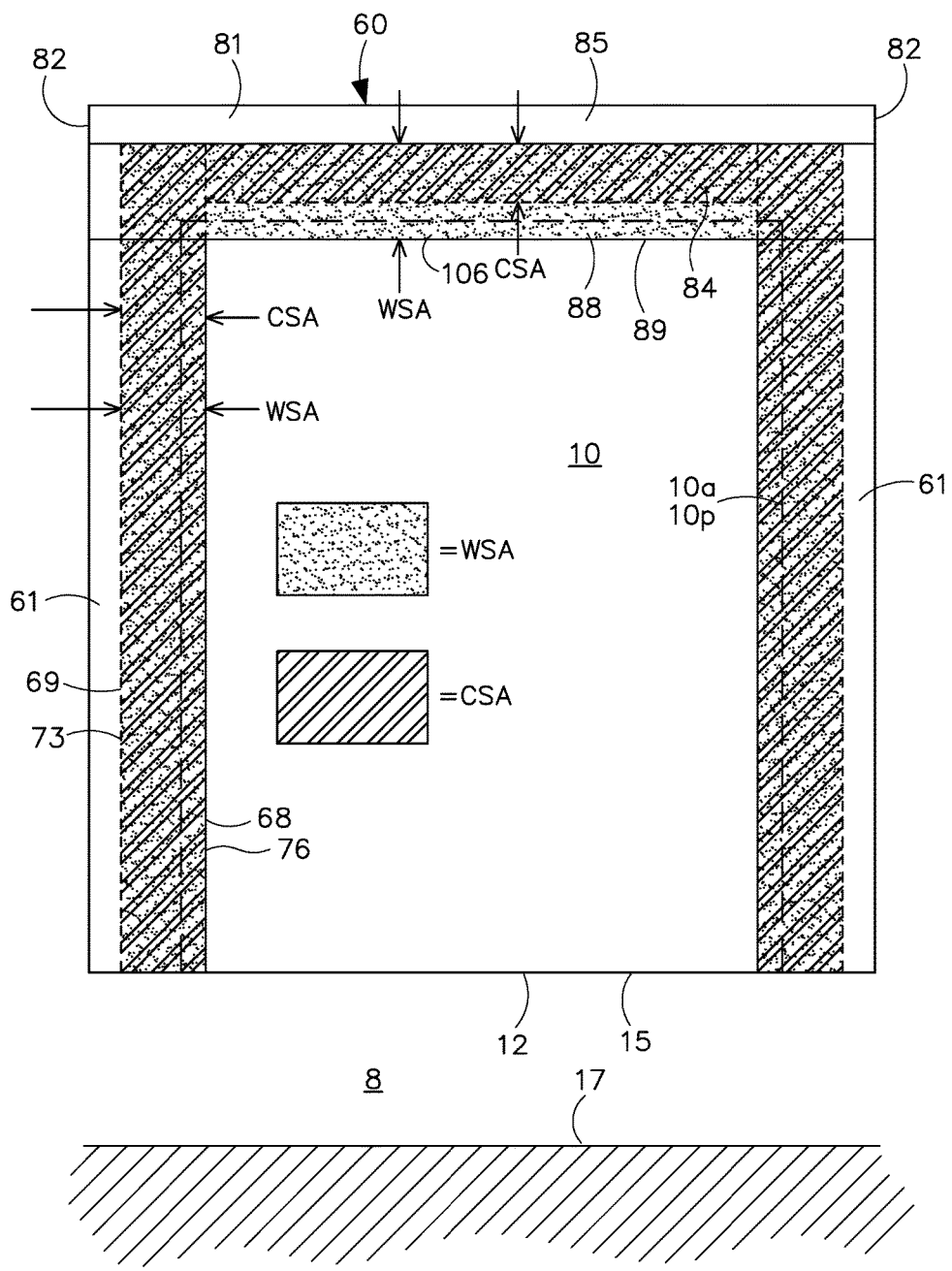
FIG. 2B is a front view of the multi-seal dock seal installed around the loading bay door opening with dashed lines showing the door opening of the dock bay, and showing the compression seal and wipe seal engagement areas or zones with the side compression seal engagement area or zone (CSA) and side wipe seal engagement area or zone (WSA) projecting into the door opening the same distance.

The third flexible component or inward extending wiping pad 75 spans the height of the dock opening 10, and is secured to the outer end 71 of the extension pad 70 along that distance. The pad 75 has a length defined by its inner and outer ends 76 of about sixteen inches. The wipe seal pad 75 length extends inwardly into the bay opening 10 projection 10p about the same amount as the compression seal pad 65, or about four inches into the bay opening projection 10p as shown in FIGS. 2B and 4C. The inner and outer surfaces 77, 78 of the pad 75 define its thickness, which is about two inches. The flexible wipe pad 75 extends inwardly toward the door opening 10 projection 10p so that its inner end 76 is in registered alignment with the innermost part of the angles surface 68 of compression pad 65.

The wipe pad 75 has an interior that is preferably made of the same type of open cell polyurethane foam as the extension pad 70, and has a density of about 2 lbs/cubic foot, an ILD of about 90-110 lbs/50 sq.in., a tensile strength of about 12 lbs/foot, a tear strength of about 1.2 lbs/in., and memory to resiliently return to its original shape when the trailer pulls away and the foam is not compressed or flexed. The wipe pad 75 is wrapped in a durable vinyl covering. This covering has securement flaps to firmly join the wipe seal pad 75 to the front or outer end 71 of extension pad 70, such as via Velcro or other suitable form of securement. The bottom end 63 of each side seal assembly 61 has a flexible securement strip or sheet. The sheet or stabilizing piece allows the wipe seal pad 75 to bend inwardly when engaging the side 23 of a trailer 20. The strip prevents the wind from blowing the wipe pads 75 outwardly. The sheet also closes off a gap between the pads 65, 70 and 75 that would otherwise allow air to leak by the side seal assemblies 61.

When the pads 65, 70 and 75 are in their non-flexed and non-compressed conditions (FIG. 4C), the inner and outer surfaces 73 and 74 of the flexible pad 70 are in generally parallel registered alignment with the front surface 66 of the compression pad 65. When the pads 65, 70 and 75 are in this non-flexed and non-compressed condition, the surfaces 66, 73 and 78 of the pads define an open area or space that has a generally square shape. When engaging the sides 23 of a trailer 20 to form a wipe seal 91 (FIGS. 4A-B), the flexible pad 75 is bent rearwardly toward the building wall 8 with its inner end 76 coming close to but not touching the front surface 66 of the compression pad 65.

Figure 2C:
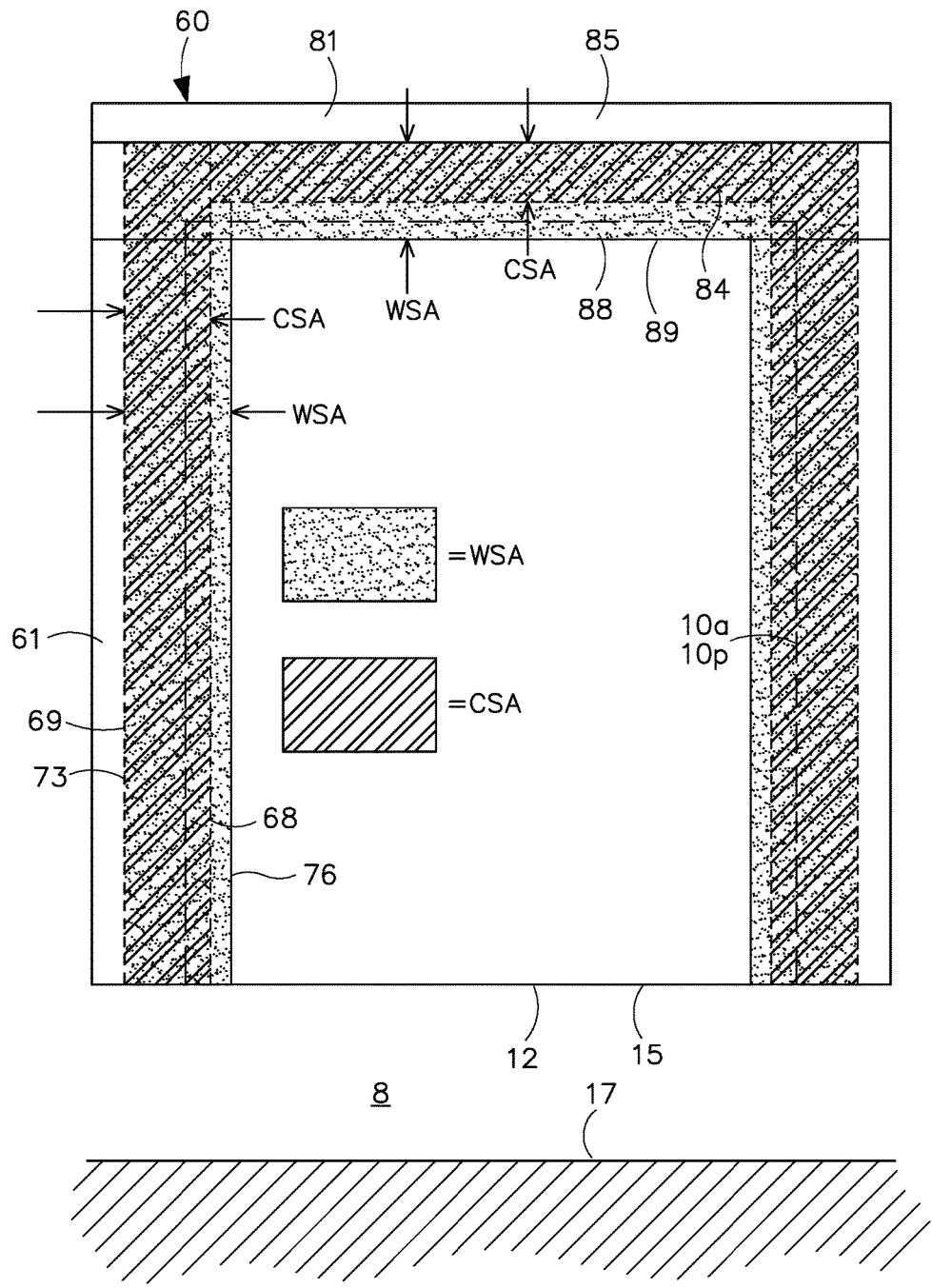
FIG. 2C is a front view of the multi-seal dock seal installed around the loading bay door opening with dashed lines showing the door opening of the building, and showing side wipe seal engagement area or zone (WSA) projecting into the door opening a greater distance than the side compression seal engagement area or zone (CSA).

The thickness of the compression pads 65 and the length of the extension and wipe seal pads 70 and 75 can be adjusted for various loading dock installations. For example, the length of the wipe seal pad 75 can be adjusted to extend into the door opening 10 projection 10p more than the compression seal pad 65 extends into the opening 10 projection 10p as shown in FIG. 2C. Thus, the side seal assemblies 61 can adjust the width of the compression pads 65 and length of the extension and wipe pads 70 and 75 to adjust the engagement areas or zones (CSA and WSA) to meet the needs of a particular loading dock facility 5 or even a particular loading bay 6.

As best shown in FIGS. 5A-C and 8, the top seal assembly 81 has a rigid backing plate, compression type foam pads 84 and 85, and a hanging flap or curtain 88. The backing or mounting plate is bolted or otherwise rigidly secured to the outer walls 8 of the building 5. The mounting plate is similar to plate 64, and is about two inches thick, about twelve inches wide and spans the top width 13 of the loading bay opening 10. The plate is preferably wood, steel or rigid plastic that is robustly designed to prevent warping, cracking or other deformation during use. The plate is installed with its lower edge offset a uniform distance of about one inch from the top edge 10b of the bay opening 10.

The first flexible component or compression pad 84 spans the top width of the bay opening 10, and is glued or otherwise firmly secured to the backing plate along that distance. The compression pad 84 has a generally square cross-sectional shape as show in FIGS. 5A-C and 8. The surfaces of the pad 84 define its thickness and width of about eight inches. The pad 84 does not extend into the bay opening 10. The compression seal pad 84 has an interior that is preferably formed from an open cell polyurethane foam with a density of about 1.2 pounds per cubic foot and an ILD of about 28-36 lbs/50 sq.in., a tensile strength of about 12 lbs/foot, a tear strength of about 1.2 lbs/in., and memory to resiliently return to its original shape when the trailer 20 pulls away and the foam is not compressed. A vent is located on the underside of the compression pad 84.

The second flexible component or canopy pad 85 spans the width of the door opening 10, and is glued to the mounting plate along that distance. The pad 85 is positioned radially outward or upward from the compression pad 84 relative to the door opening 10. The lower surface of the canopy pad 85 is in abutting engagement with the upper surface of the top compression pad 84, and the pads and are glued together to provide support for the canopy pad 85. The canopy pad 85 has a substantially triangular cross-sectional as shown in FIGS. 5A-C and 8. The pad 85 has a width of about four inches at its base or rear end, and a width of about one inch at its front or outer end 86. The canopy pad 85 extends forward from the wall 8 a distance of about 2 feet. The pad 85 has an interior that is formed from a compression type foam that is preferably an open cell polyurethane foam with a density of about 2 lbs/cubic foot, an ILD of about 90-110 lbs/sq.in., a tensile strength of about 12 lbs/foot, a tear strength of about 1.2 lbs/in., and memory to resiliently return to its original shape when the trailer 20 pulls away and the foam is not compressed or flexed. The compression and canopy pads 84 and 85 are wrapped in a durable vinyl covering to form an integral structure. The vinyl covering is preferably a PVC vinyl coated polyester having a weight of about 22 to 50 ounces per square yard. The covering has a flap that extends to hide the backing plate 64 when installed.

The downwardly extending flap or curtain 88 is secured to and hangs from the outer end 86 of the forward extending canopy pad 85. The upper end of the flap 88 is preferably joined to the outer end 86 of the canopy pad 85 via Velcro or other suitable form of securement. The flap 88 is made of a durable vinyl. The flap 88 has a height of about twelve inches and a lower end 89 and extends about four inches into the bay opening 10 projection 10p. A stiffening sheet is attached to the wipe flap 75 to ensure a proper seal with the top of the trailer during use.

Figure 9:
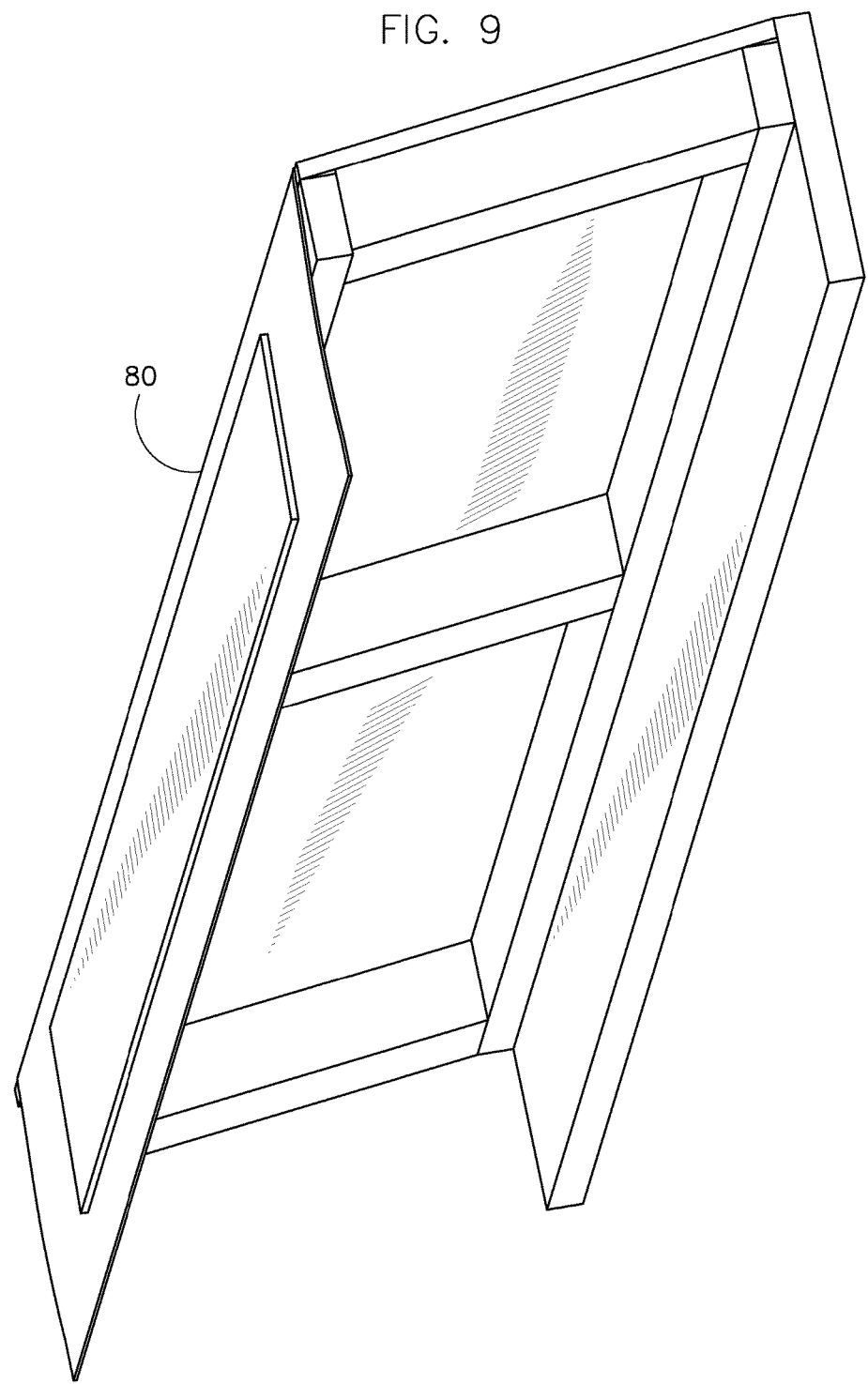
FIG. 9 is a perspective view showing a conventional header with a wooden support frame and front curtain.
Figure 10:
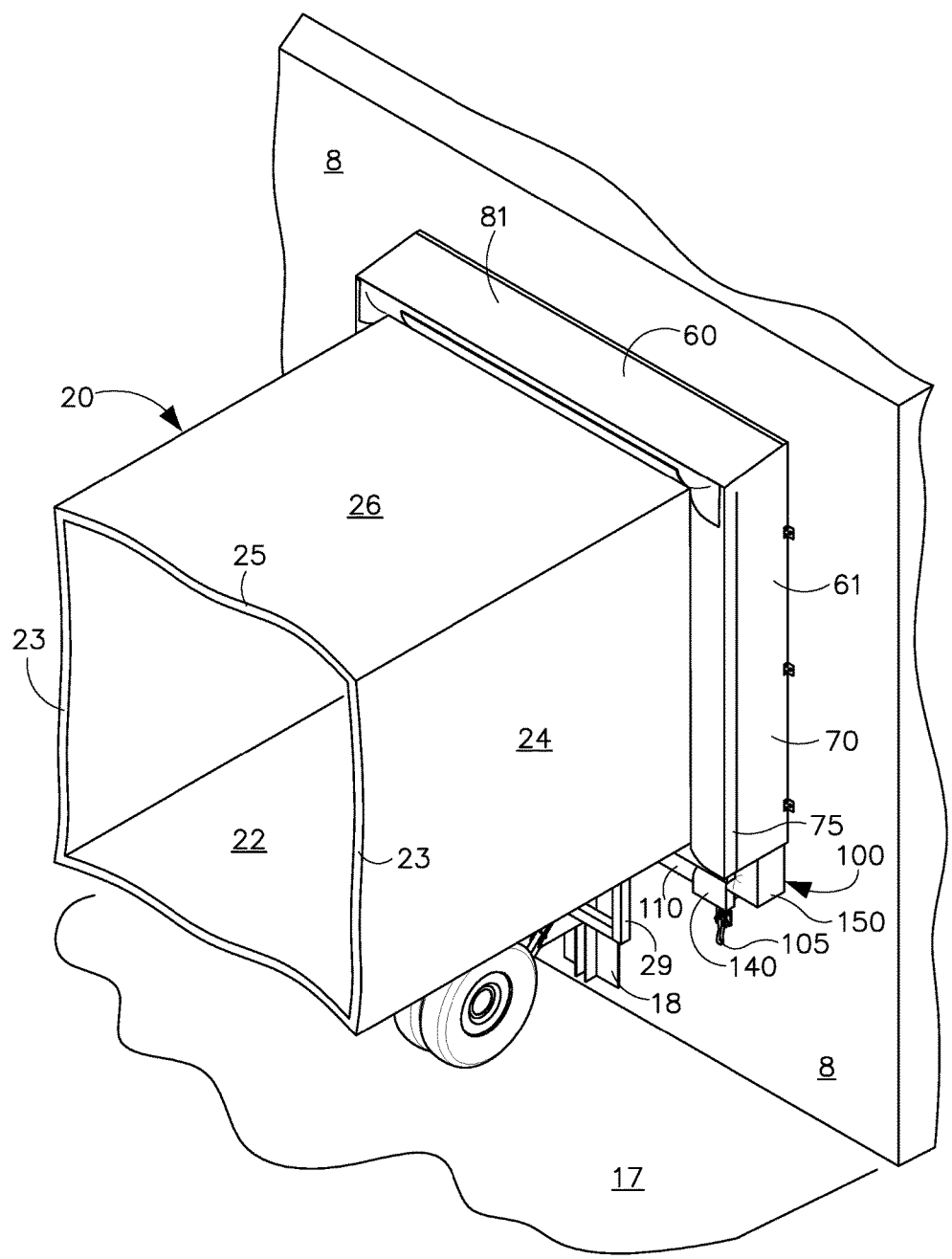
FIG. 10 is a perspective view of a trailer backed into a loading bay having a deeper pit and equipped with a first embodiment of the present pit seal invention as well as a multi-seal dock seal having side seals and a top seal to form a continuous 360-degree weather seal around the bottom, sides and top of the trailer.

As state above, the side seal assemblies 61 of the dock seal 60 are suited for use with a conventional rigid header frame 80 as shown in FIG. 9. In this embodiment, the top seal assembly 81 is replaced by a conventional header frame with a downwardly hanging front curtain, such as a header with a wood framed construction.

When installed, the dock seal 60 extends along the two vertical sides 10a of the bay opening 10, and preferably around the sides 10a and horizontal top 10b of the opening 10 as shown in FIGS. 1A-B. During use, both a continuous wipe seal 91 and a continuous compression seal 92 are formed with the trailer 20 to produce a continuous multi-seal 93 along the sides 23 of the trailer, and preferably around the sides 23 and roof 25 of the trailer as shown in FIGS. 3, 4A-B and 5A-B. When the trailer 20 partially backs into the dock as in FIGS. 4B and 5B, the single-seal or wipe seal 91 is formed by the flex pads 75 and flap 88. The flex pads 75 flexingly engage and seal against the side walls 23 of the trailer, to form a continuous wipe seal 91 along the side walls 23 of the trailer, and when used with the top wipe seal flap 88, combine to flexingly engage and seal around the sides walls 23 and roof 25 of the trailer to form a continuous wipe seal 91 around the sides and roof of the trailer. The flex pads 75 and flap 88 bend rearwardly to wipe along the sides and top walls 23 and 25 of the trailer. The higher density foam of the flexible wipe seal pads 75 and their extension pads 70 provide sufficient rigidity during their wiping action to from a continuous wipe seal 91 along the side walls 23 of the trailer 20, and when used in conjunction with a canopy curtain, around the sides and roof 23 and 25 of the truck or trailer.

Figure 4A:
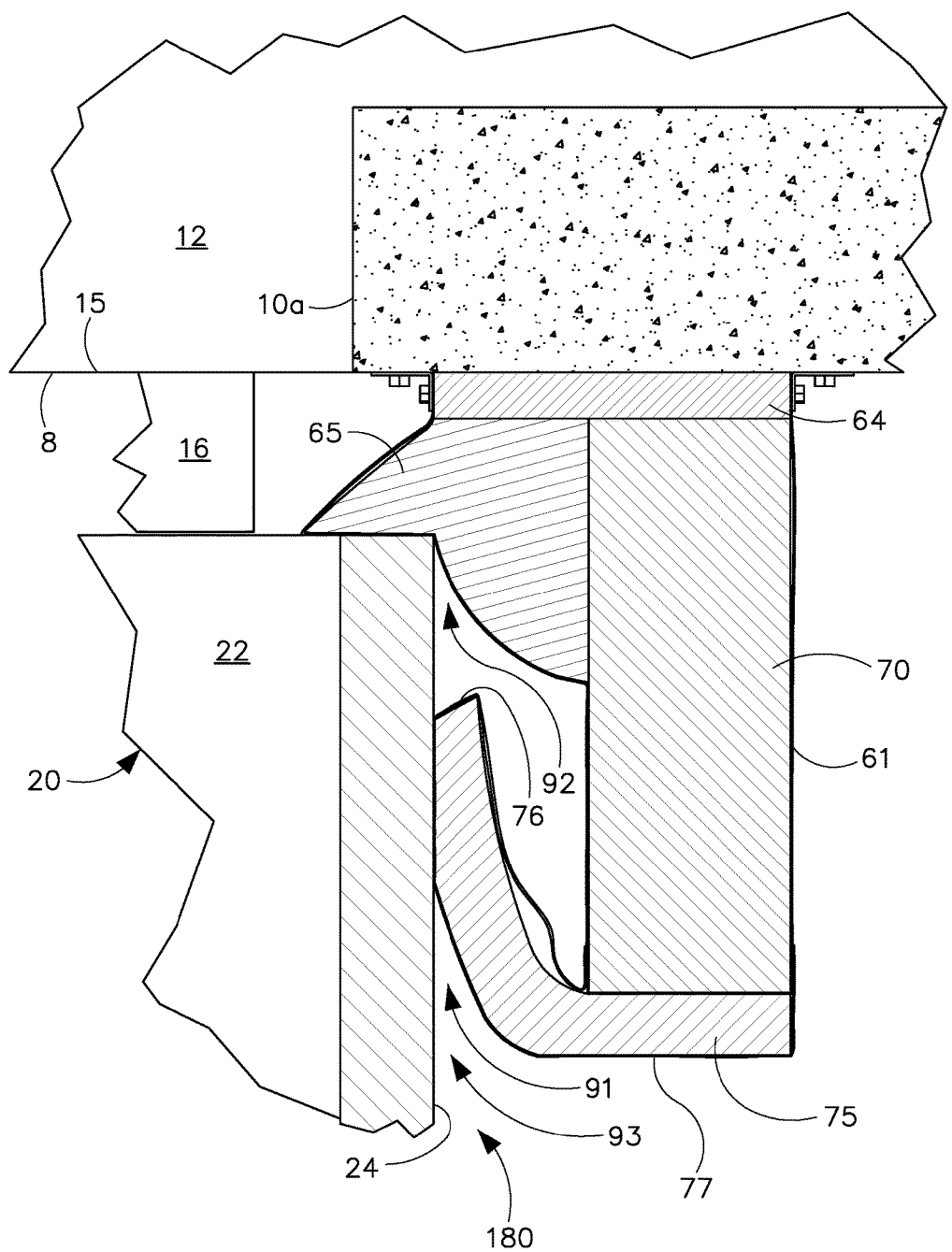
FIG. 4A is a cross-sectional view taken along line 4A-4A of FIG. 3 showing the trailer fully entered in the dock bay, the side wipe seal pad flexingly and sealingly engaging and forming a wipe seal with the outer surface of the side wall of the trailer and the side compression seal pad compressingly and sealingly engaging and forming a compression seal with the rear end of the side wall of the trailer to form a multi-seal between the trailer side wall and loading dock.
Figure 4B:
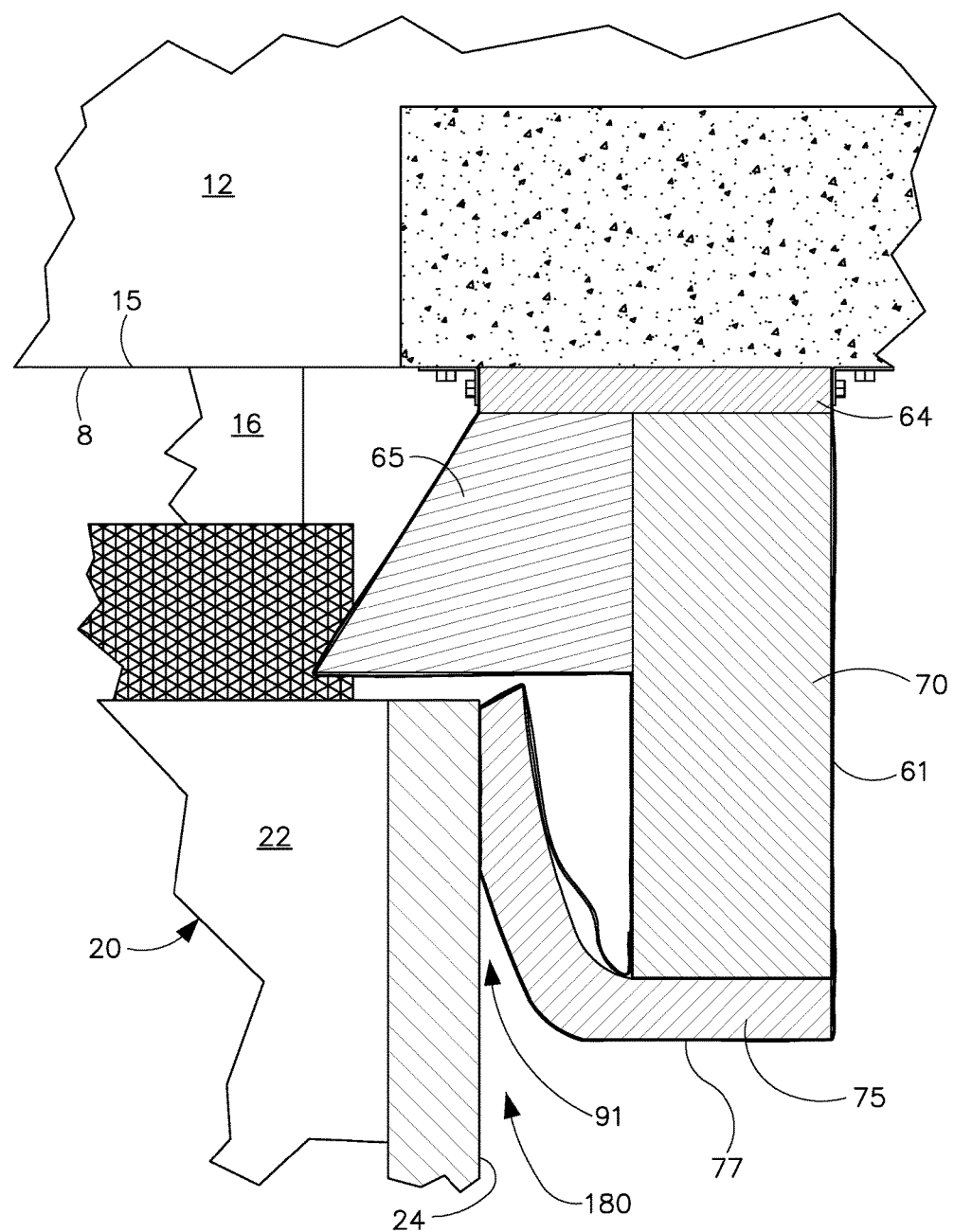
FIG. 4B is a cross-sectional view taken along line 4B-4B of FIG. 3 showing the trailer partially entered in the dock bay due to a trailer step platform preventing compressed engagement with the side compression seal pad, and showing the side wipe seal pad flexingly and sealingly engaging and forming a wipe seal with the outer surface of the side wall of the trailer to form a single seal between the trailer wall and loading dock.
Figure 5A:
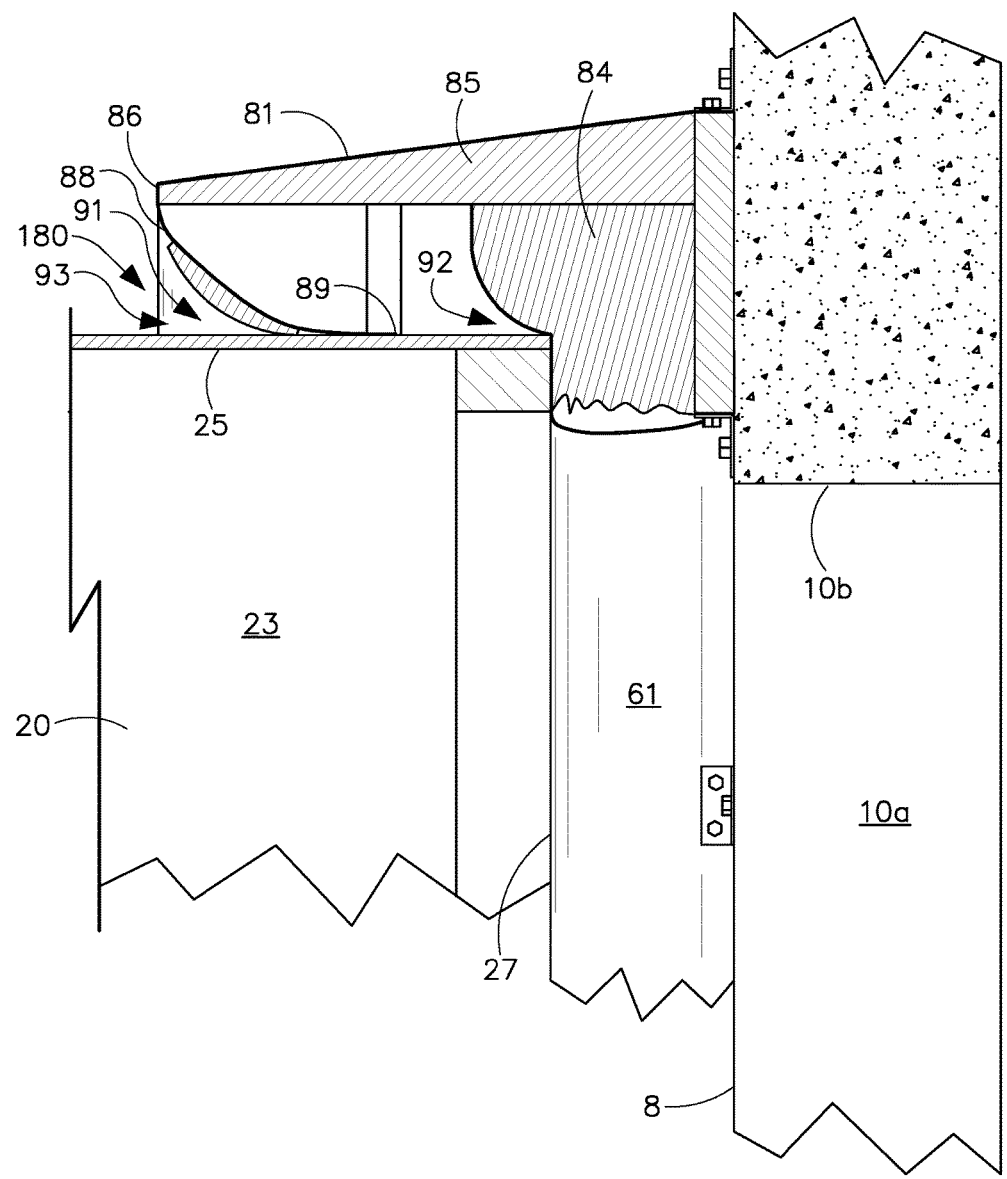
FIG. 5A is a side-sectional view taken along line 5A-5A of FIG. 3 showing the trailer fully entered in the dock bay, the top wipe seal pad flexingly and sealingly engaging and forming a wipe seal with the outer surface of the trailer roof and the top compression seal pad compressingly and sealingly engaging and forming a compression seal with the rear end of the trailer roof to form a multi-seal between the trailer roof the loading dock.
Figure 5B:
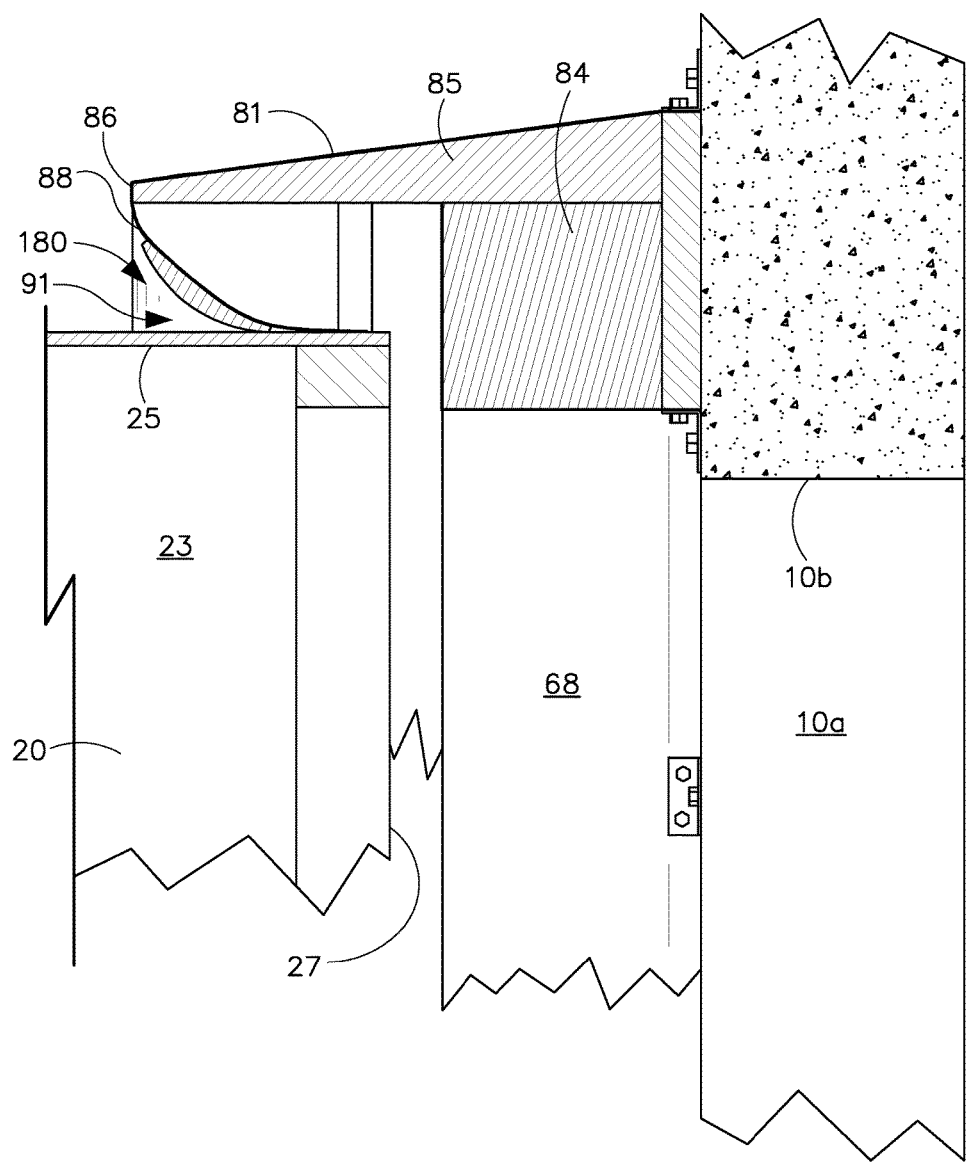
FIG. 5B is a side-sectional view taken along line 5B-5B of FIG. 3 showing the trailer partially entered in the dock bay so that the trailer roof does not engage the top compression seal, and showing the top wipe flap flexingly and sealingly engaging and forming a wipe seal with the outer surface of the trailer rooftop forming a single seal between the trailer roof and loading dock.
Figure 8:
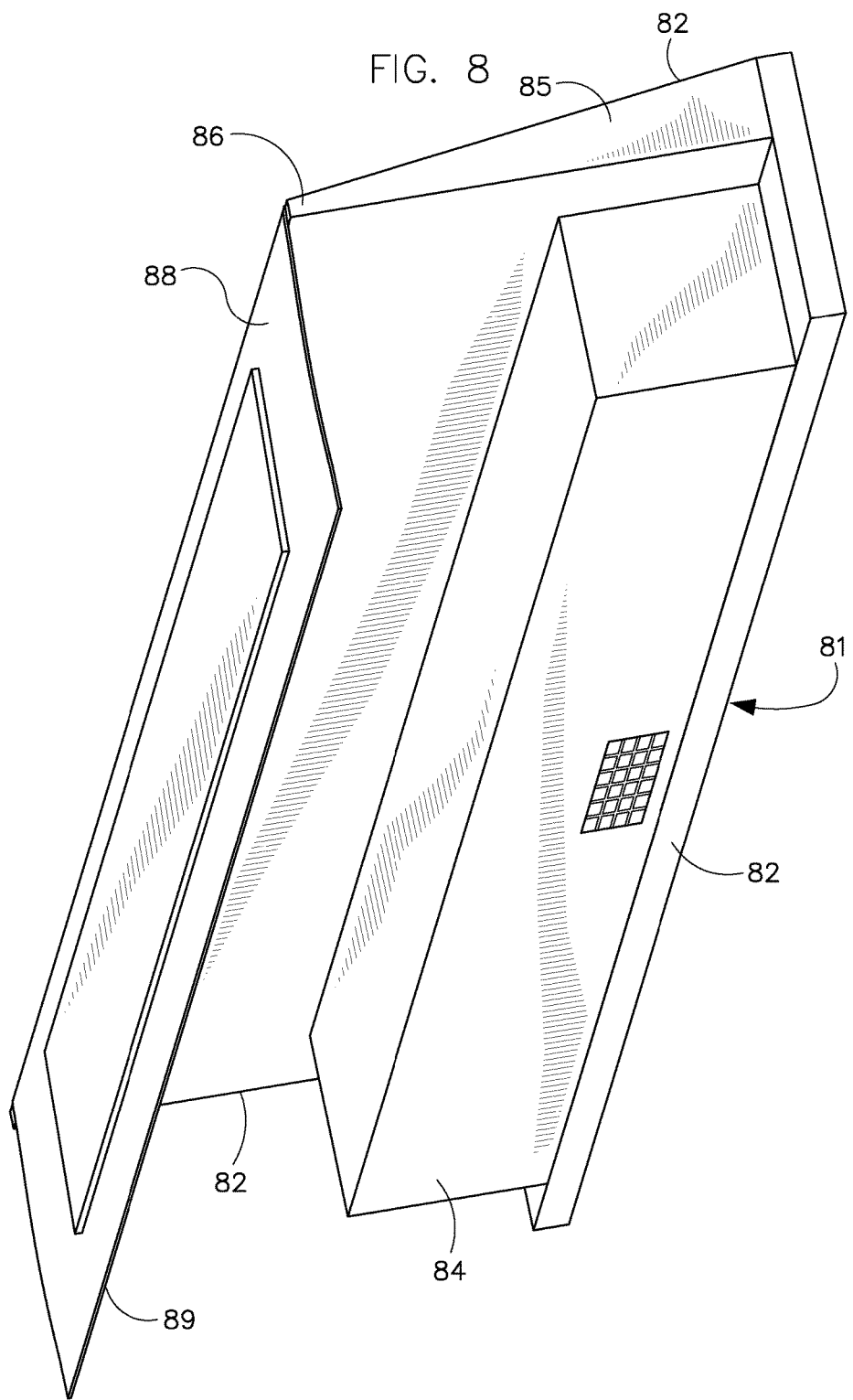
FIG. 8 is a perspective view of the top seal assembly of the multi-seal.

When the side seal assemblies 61 include the compression pad 65 as in FIGS. 4A and 5A, the rear end 27 of the side walls 23 and roof 25 of the trailer compressibly engages and seals against pads 65 to form continuous compression seals 92 along the rear end 27 of the sides 23 of the trailer, and when used with top compression pad 84 combine to form a continuous compression seal around the rear end 27 of the sides and top 23 and 25 of the trailer. The formation of the continuous wipe and compression seals 91 and 92 produces a continuous multi-seal 93 along the trailer side walls 23, and around the trailer side walls and roof. However, should the trailer 20 fail to back completely into the dock as in FIGS. 4B and 5B so that the compression seal 92 is not fully engaged or formed, then the side seal assemblies 61 still provide a continuous wipe seal 91 around the perimeter of the trailer to seal the loading bay opening 10 from weather and the environment. Similarly, should the trailer 20 fail to completely engage the wipe seal pads 75 and flap 88 to form a continuous wipe seal 91, then the side seal assemblies 61 can still provide a continuous compression seal 92 along the side walls 23, and preferably around the rear end 27 of the trailer 20 to seal the bay opening 10 from weather and the environment.

Figure 4C:
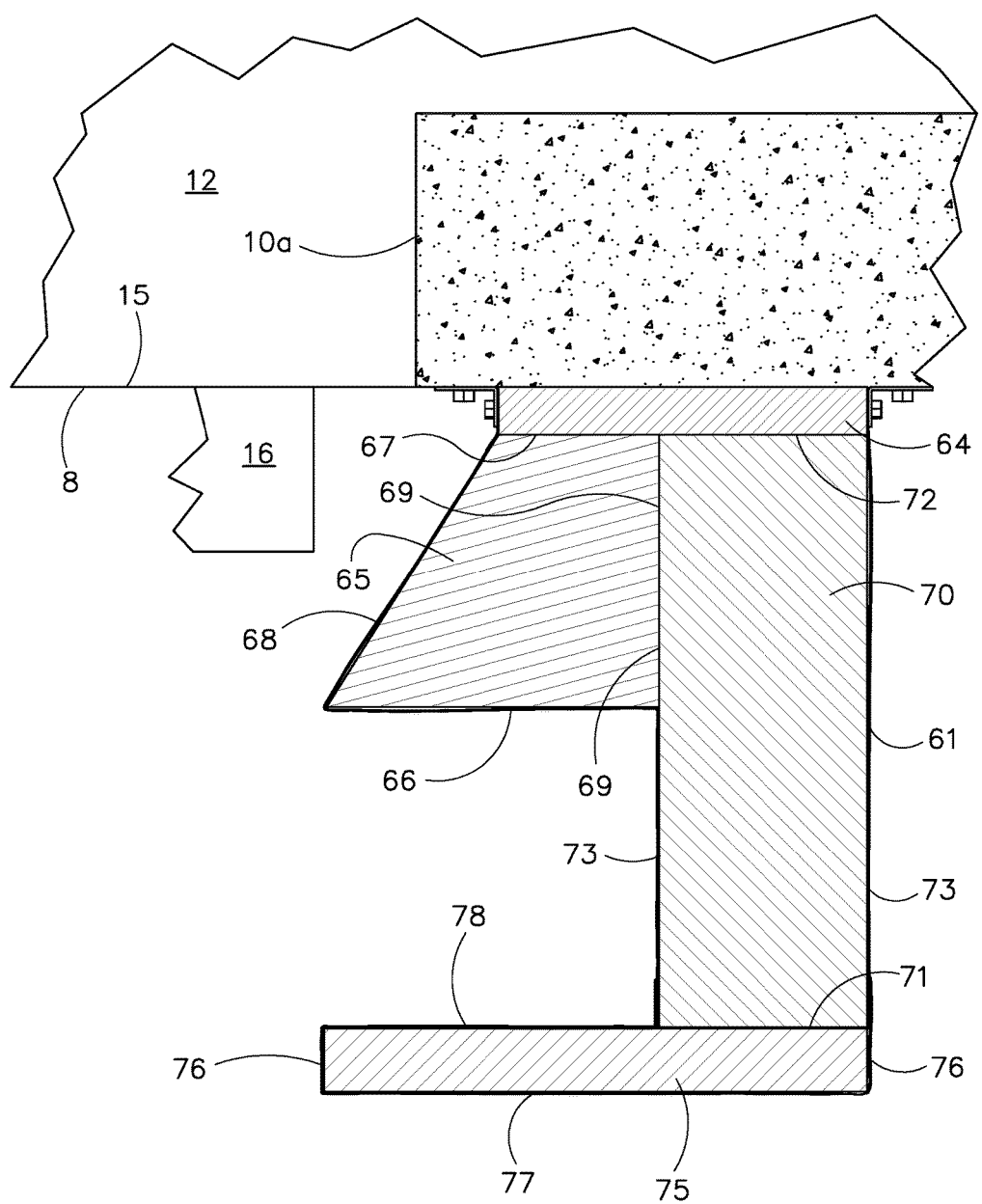
FIG. 4C is a top sectional view showing the side seal assembly in a normal non-engaged position when no trailer is parked in the loading dock bay.

As shown in FIGS. 4A-C, the side wipe seal pad 75 has an inwardly extending length that is sufficiently long to extend into the door opening 10 the same distance as the side compression pad 65. (FIG. 4C). The lengths of the side wipe seal pad 75 and side extension pad 70 are sized so that the side wipe seal pad 75 does not contact the front surface 66 of the side compression seal pad 65 when it is pushed back by the trailer 20. (FIGS. 4A-B). Each side wipe seal pad 75 is positioned forward from its respective compression pad 65 just far enough to prevent it from contacting the compression pad 65 when in wiping engagement with the trailer 20. This prevents the side wipe pad 75 from being pinched between the rear end 27 of the trailer 20 and its respective compression pad 65. To avoid unnecessary wind and snow loads, the lengths of the extension pad 70 and canopy pad 85 are kept to a minimum to achieve desired wipe pad 75 and top flap 88 lengths.

The present invention pertains to a pivoting pit seal assembly that seals the pit area 11 below a telescoping lip dock leveler 30, and combines with a variety of side seals 60 or 61 and top seals 80 or 81 that can be installed around the dock door opening 10 to form a 360-degree seal around the rear end 27 of the trailer 20. The pivoting pit seal assembly is generally indicated by reference number 100 as in FIGS. 10-22. The pit seal assembly 100 is adapted for telescoping lip levelers 30 installed in deeper or deeper pits 11. In the shallower pit embodiment, the building bumpers 16 of the loading bay 6 are located to the sides of the pit as shown in FIGS. 10-15. In the shallower pit embodiment, the building bumpers 16 of the loading bay 6 are located below the pit 11 as shown in FIGS. 16-20.

The pit 11 has a flat, generally horizontal floor 12, vertical side and rear walls 13 and 14, and an open front end and front edge 15. The height, width, and length of the pit varies depending on the size and type of leveler installed. When a telescoping lip leveler 30 is installed, the pit can be deeper or shallower. The door opening 10 has a generally rectangular shape with a uniform height and width across the length and width of the opening, but the sides 10a of the opening can have shoulders at the dock floor so that the pit opening is less wide. The depth of the pit 11 can impact where and how the pivoting pit seal assembly 100 is secured to the building. As noted above, the front edge of the pit 11 typically has a piece of angle iron 19 spanning the width of the pit. The angle iron 19 is rigidly anchored to the concrete structure of the building 5.

The pivoting pit seal assembly 100 includes a mounting bracket 102, a securement latch 105 and a pit seal 110 with a rigid base 112 and compression pad 120. The mounting bracket 102 has a plate with a flat bottom surface to flushly engage the front wall 8 or pit floor 12, and an outwardly projecting portion that forms a pivot end or hinge end 104 for receiving a pivot rod or pin at a location spaced a predetermined distance from the front wall 8 or pit floor 12. The securement latch 105 has a flat plate with a flat bottom surface to flushly engage the front wall 8 or pit floor 12, and a selectively engagable and releasable clasp 107. The pit seal assembly 100 is preferably anchored to the building 5 by welding or otherwise firmly attaching one or both of the bracket 102 and latch 105 to the angle iron 19 at the front edge 15 of the pit 11. When the pit 11 does not include an angle iron 19 or the size of the angle iron 19 does not allow the mounting bracket 102 and fastening latch 105 to be located over the angle iron 19, then the bracket 102 and fastener 105 are anchored to the building 5 via concrete expansion anchors or otherwise firmly secured to the building 6.

Figure 15:
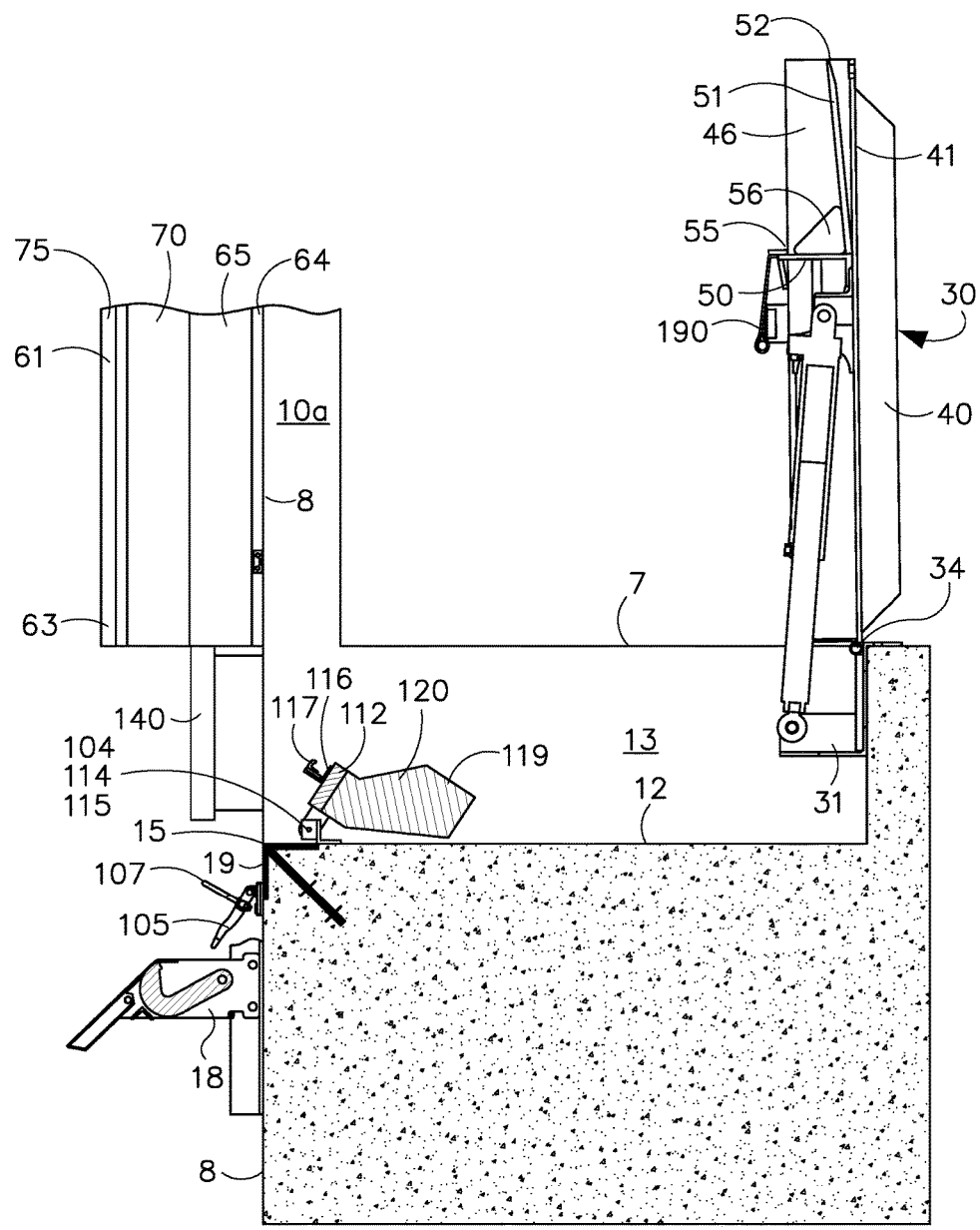
FIG. 15 is a side sectional view showing the pit seal assembly with its bumper pad in a non-compressed condition and with the pit seal rotated backward to facilitate access to and cleaning of the pit.
Figure 20:
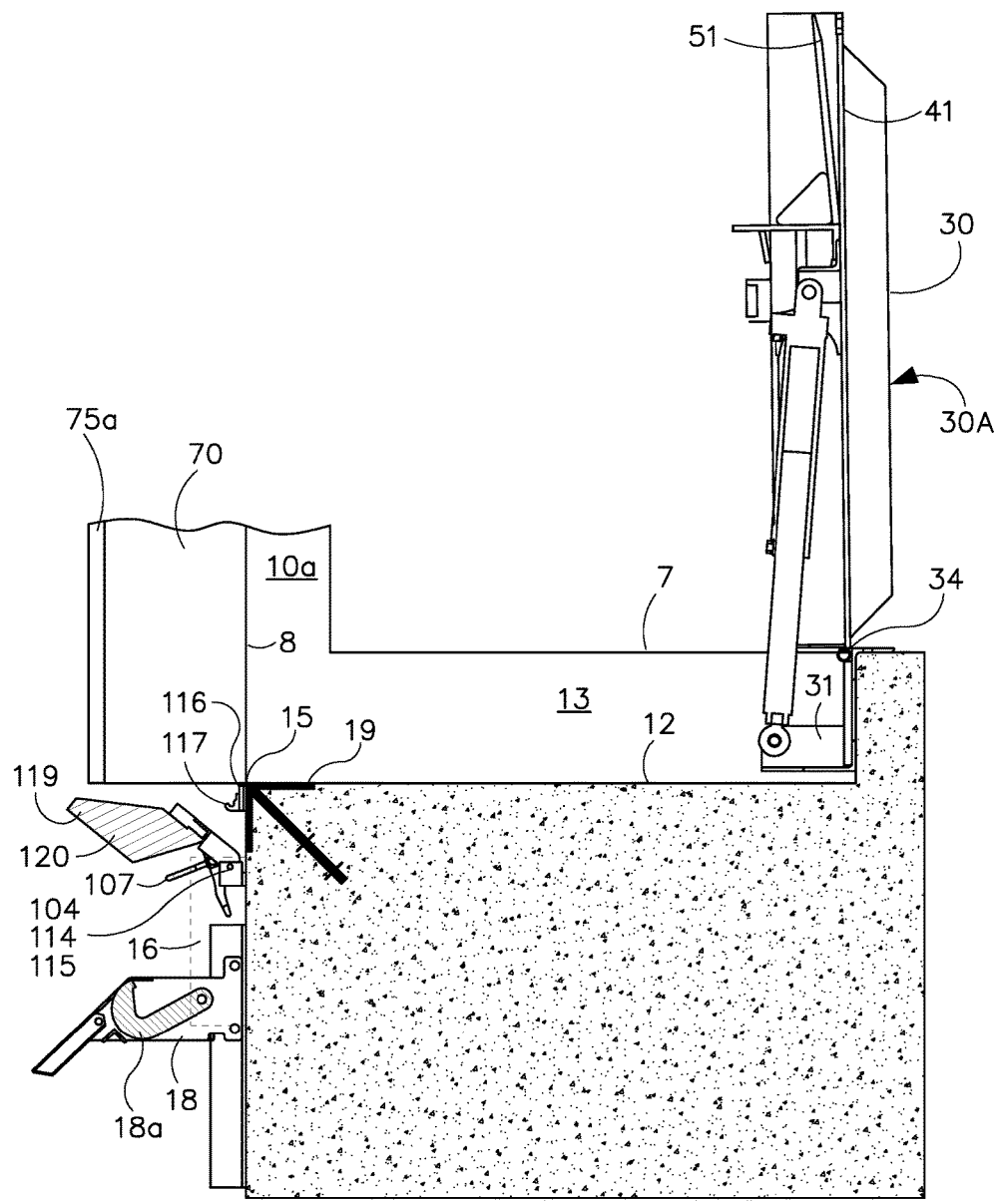
FIG. 20 is a side sectional view showing the vertical side seal in a non-compressed condition and with the pit seal rotated backward to facilitate access to and cleaning of the pit.

The pit seal 110 has a base 112 that generally takes the form of a metal plate with a flat bottom surface. The base plate 112 spans the width of the pit 11. The base 112 has a pivoting end 114 and a selectively fastened free end. The pivoting end 114 has a pivot point 115 or hole for pivotally receiving the pivot rod or pin of the base plate 112. Spaced from the pivot end 114 and toward the fastened end is a base fastener 116 or hook 117. The hook 117 is selectively received and firmly held by the clasp 107 of the fastening latch 105. The pit seal 110 is movable between an upright or upwardly and forwardly angled trailer engaging position 118 that positions the compression pad 120 proximal to and above front edge of the pit 11 as shown in FIGS. 13A and 18A, and a reclined or pivoted position 119 that positions the compression pad 120 away from the front edge of the pit 11 to allow access into the pit 11 and for cleaning the pit as shown in FIGS. 15 and 20. The flat bottom surface of the plate 112 flushly engages the front wall 8 or pit floor 12 when the pits seal 110 is in its trailer engaging position 118. The plate 112 is angled away from the front wall 8 or pit floor 12 when in the pivoted position 119.

The compression pad 120 has a front 121 with forwardly angling and vertical portions 121a and 121b, a rear 122 with a forwardly angling and vertical portions 122a and 122b, a flat top 123, a bottom 124, opposed side ends 125, a resilient compressible interior 126 and a durable outer covering 127. The vertical portion of its front surface 121 is positioned to engage the rear bumper 28 of the trailer 20 when the pit seal assembly 100 is in its trailer engaging position 118. The interior 126 of the draft pad 160 is formed by a compression type foam, and is preferably an open cell polyurethane foam with a density of about 1.2 lbs/cubic foot, an ILD of about 28-36 lbs/50 sq.in., a tensile strength of about 12 lbs/foot, a tear strength of about 1.2 lbs/in., and memory to resiliently return to its original shape when the trailer 20 pulls away and the foam is not compressed or flexed. The vinyl covering 127 is preferably a PVC vinyl coated polyester having a weight of about 22 to 50 ounces per square yard. The compression pad 120 is glued or otherwise firmly secured to the top or front of the base plate 112. The cover 127 has flap portions that extend to cover and secure to the sides of the base plate 112. A vent (not shown) is located on the angling portion of the front 121 of the pad 120.

The thickness of the pit seal compression pad 120, bumper pads 140 and end gap pads 150 are specified so that there is about two inches of compression along the length of the pit seal 100 when a trailer is up against the bumpers 16. For a loading bay with five inch bumpers 16, the front surfaces of the pads 120, 140 and 150 would project seven inches beyond the front wall 8. The height of the compression pad 120 is specified so that its top surface is high enough to seal against the rear end 27 or rear bumper 28 of the trailer 20, but low enough that the rear doors of the trailer 20 will clear the compression pad 120 when the doors are opened inside the loading bay 6. The height of the pad 120 is therefore dependent the height of the dock floor 7, the depth of the pit 11 or height of its walls 13 and 14, and the types of trailers 20 being serviced.

For deeper pits as in FIGS. 11-15, the pivoting pit seal assembly 100 is pivotally secured by its mounting bracket 102 inside the pit 11. In this embodiment, when the pit seal 110 is in its trailer engaging position 118, its height is defined by the bottom 124 and the pad top 123. The depth of the pit seal 110 is defined by the vertical portion 121a of its pad front 121 and vertical portion 122a of its rear 122. The width of the pit seal 110 is equal to the width of the door opening 10 in the pit area 11. A portion 129 of the compression pad 120 and its base plate 112 are rearward of the front wall 12 and thus inside the pit 11, and a portion 128 of the pad and base plate are forward from the front wall and thus extend outside the pit 11. The base plate 112 is relatively thin in this embodiment.

The vertical trailer engaging portion of the front 121 of the pad 120 extends forward of the front wall 8 as shown in FIG. 13A. The mounting bracket 102 flushly engages and is anchored to the pit floor 12 or angle iron 19. Its pivot end 104 is proximal the front edge 15 of the pit 11. The base pivot end 114 is pivotally secured to the bracket pivot end 104 by a pivot rod or pin 115. The fastener or hook 117 extends downward from the bottom of the exterior portion 109 of the base plate 112 forward wall 8 and just outside the pit 11 proximal edge 15.

Figure 12A:
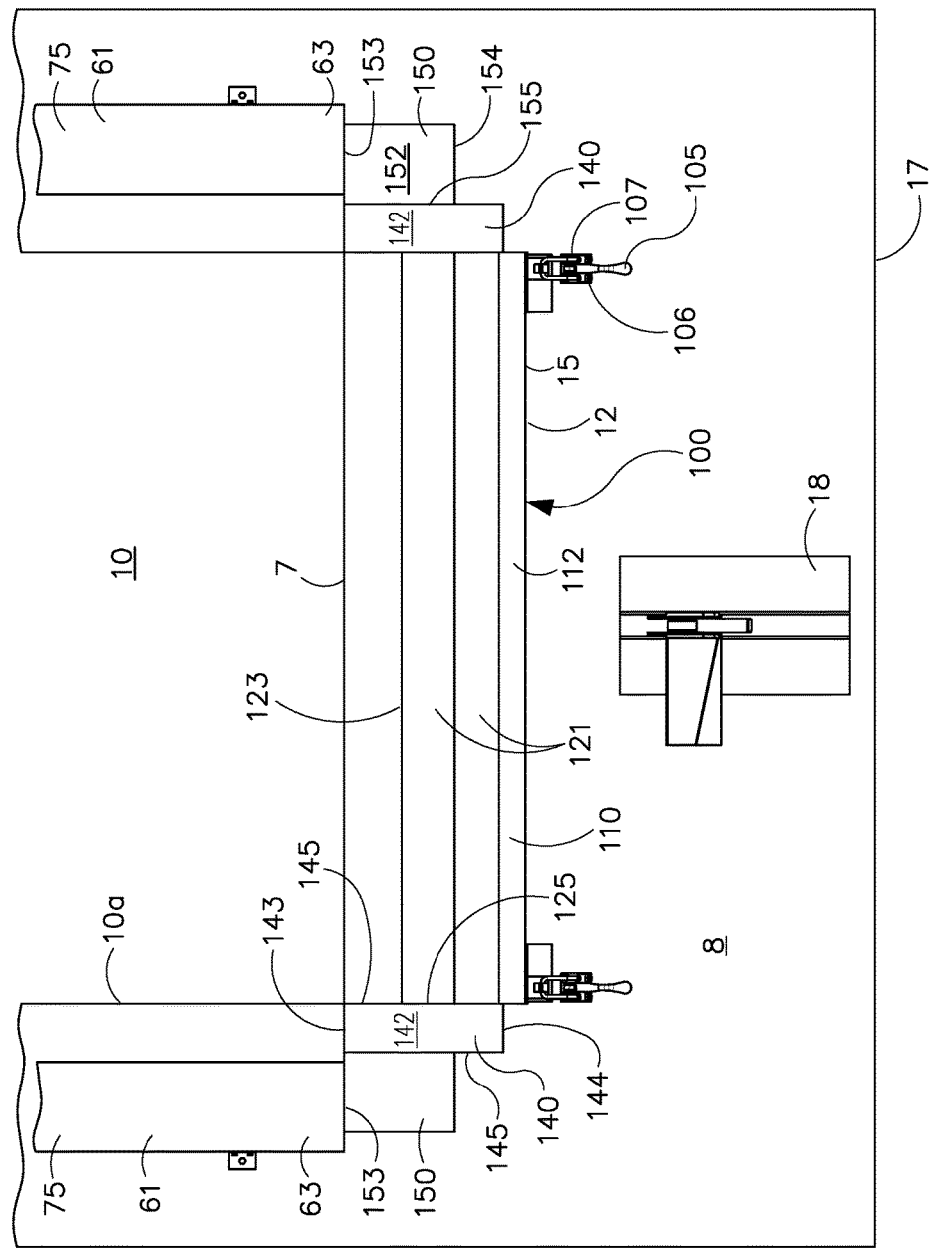
FIG. 12A is a front elevation view of a loading bay having a deeper pit equipped with the first embodiment of the pit seal assembly showing the side ends of the central compression pad sealingly engaging the sides of the bumper pads, the sides of the bumper pads sealingly engaging the sides of the gap pads, and the top of the gap pads sealingly engaging the bottom of the vertical side pads extending along the sides of the door opening.
Figure 12B:
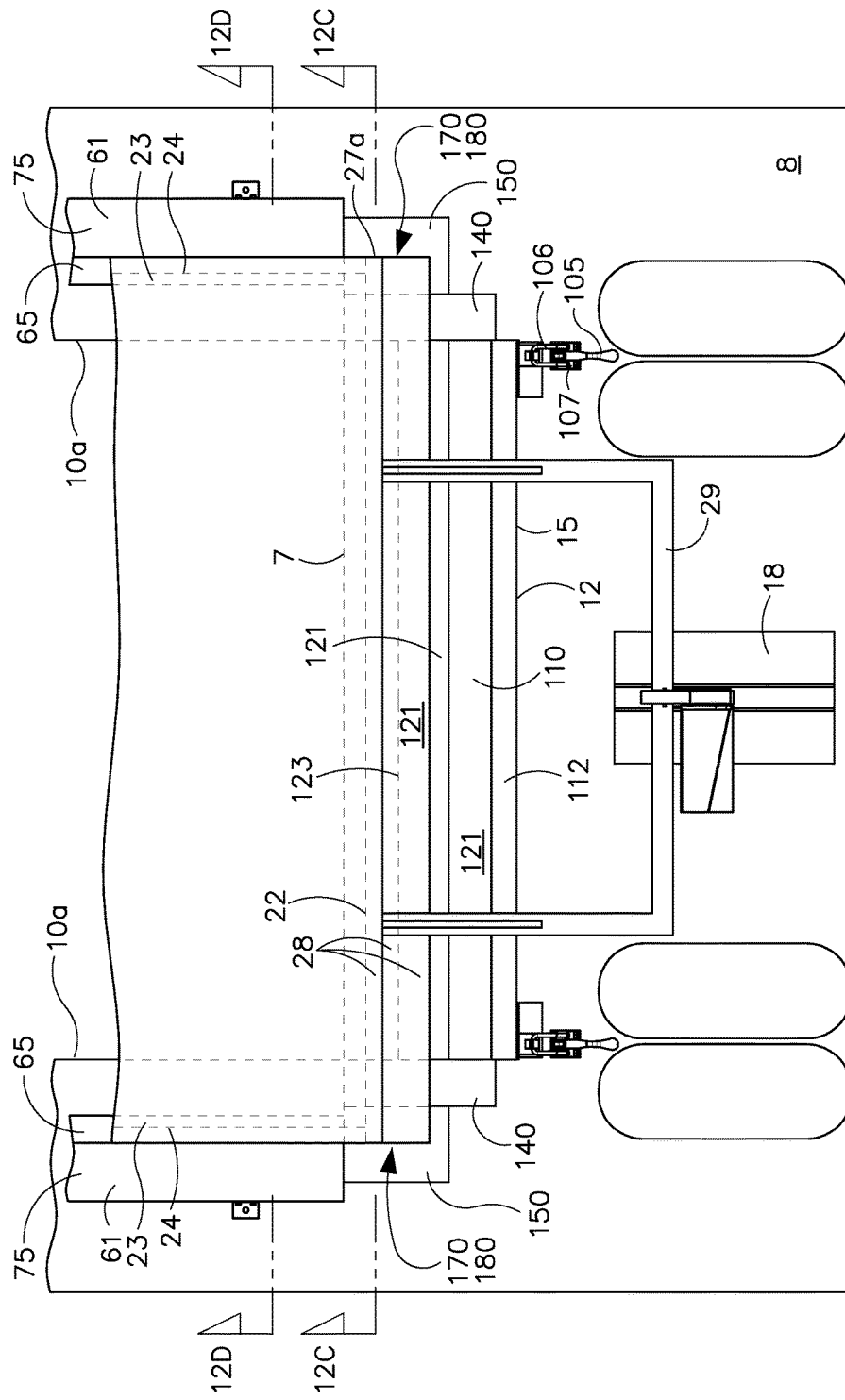
FIG. 12B is a front elevation view of a loading bay and showing the side walls and floor and rear bumper of the trailer in dotted lines to illustrate the continuous seal formed by the pit seal along the trailer bumper, and the continuous seal around the corners of the trailer and upward along the vertical side walls of the trailer.

The securement latch 105 is located outside the pit 11 as shown in FIGS. 12A and 13A. The bottom of the plate for latch 105 flushly engages and is anchored to the front wall 8 with its clasp 107 proximal the front edge 15 of the pit 11. The clasp 107 securely engages the hook 117 to hold the base plate 112 in firm engagement with the pit floor 12 to maintain the pit seal 110 in its upright or upwardly angled trailer engaging position 118. When the latch clasp 107 is movingly released from the hook 117, the pit seal 110 is free to rotate about its pivot end 114 and into its reclined or pivoted position 119. This is done by rotating the pit seal 110 upwardly from the pit floor 12 and rearwardly into the pit 11. The pit seal assembly 100 preferably includes a stop that spaces the pit seal 110 from the floor to allow pit cleaning when in the pivoted position 119. For the deeper pit embodiment (FIGS. 11-15), the trailer bumpers 16 are located along the sides 10a of the door opening 10 laterally adjacent to and at a height about the same as the pit floor 12. In this embodiment, the pit seal assembly 100 includes bumper pads 140 and end gap pads 150.

The bumper pads 140 are secured over the building bumpers 16 and are attached via screws or other forms of firm securement to the bumper mounting brackets (not shown). The height and width of the bumper pad 140 is about that of the bumpers 16. Each bumper pad 140 has a front or outer surface 142, top surface 143, bottom surface 144 and side surfaces 145, a resilient compressible interior 146 and a durable covering 147. The interior 147 is preferably formed from an open cell polyurethane foam with a density of about 1.2 pounds per cubic foot and an ILD of about 28-36 lbs/50 sq.in., a tensile strength of about 12 lbs/foot, a tear strength of about 1.2 lbs/in., and memory to resiliently return to its original shape when the trailer 20 pulls away and the foam is not compressed. The vinyl covering 147 is preferably a PVC vinyl coated polyester having a weight of about 22 to 50 ounces per square yard. The interior foam 146 is has a sufficient thickness so that each pad 140 extends that distance outwardly from the front of the bumper 16. The bumper pad front surface 142 is in planar registry with the vertical portion of the pit seal front surface 121. Each side end 125 of the compression pad 120 snuggly engages the side end 145 of its adjacent bumper pad 140 when the pit seal is in its trailer engaging position 118. Wear strips (not shown) are placed on the front surface 142 of the bumper pads 140 for added durability and protection.

Figure 12C:
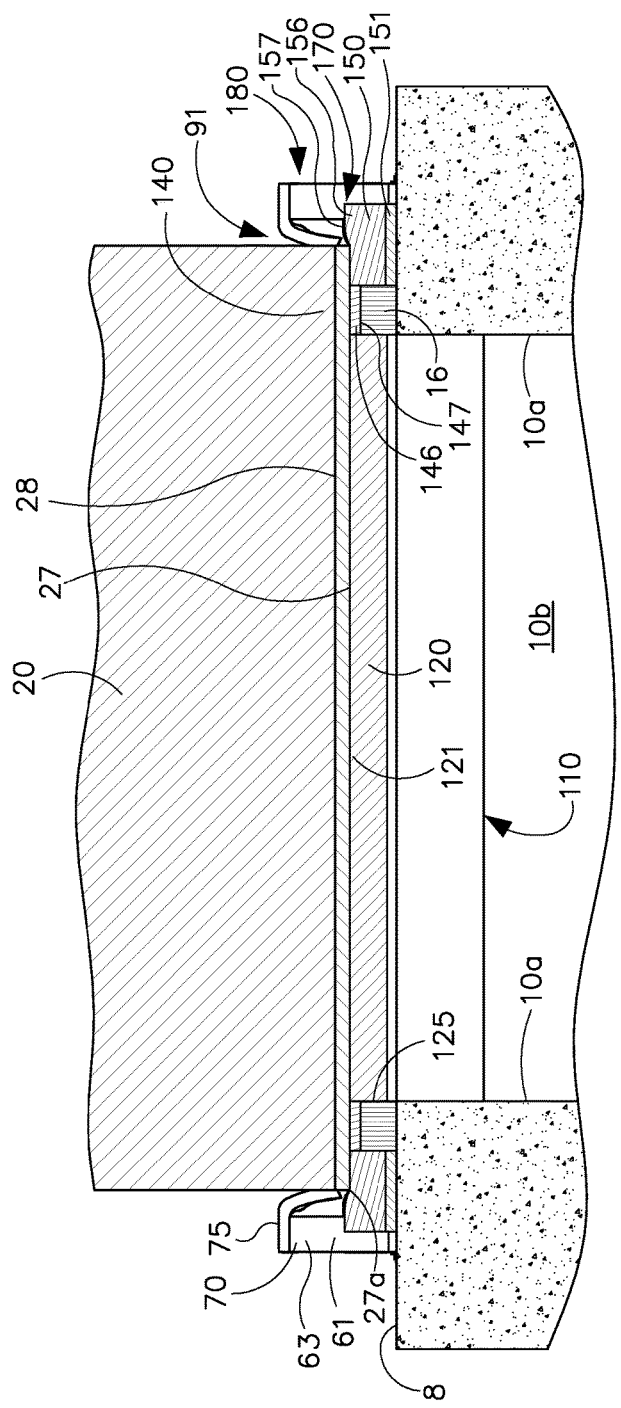
FIG. 12C is a side sectional view taken along line 12C-12C of FIG. 12B and showing the pit seal and its central compression pad, bumper pad, and gap pad forming a continuous seal along the rear bumper of the trailer and showing the continuous seal extending around the corners of the trailer and upward along the vertical side walls of the trailer.
Figure 12D:
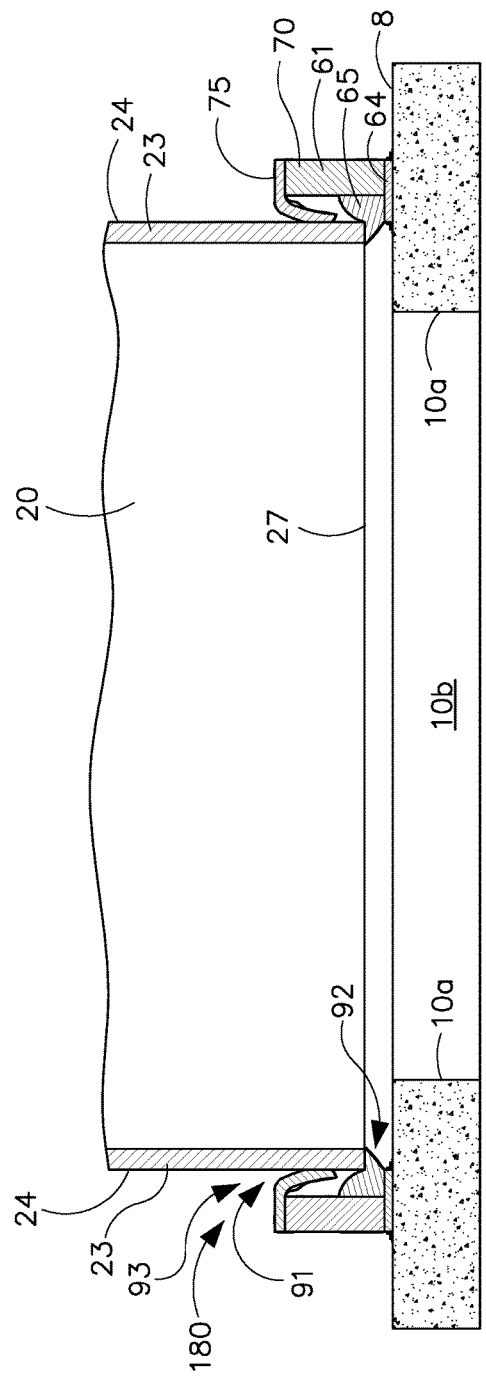
FIG. 12D is a side sectional view taken along line 12D-12D of FIG. 12B and showing the vertical multi-seal dock seals and their compression pads and wipe seals engaging and sealing the vertical side walls of the trailer.
Figure 13B:
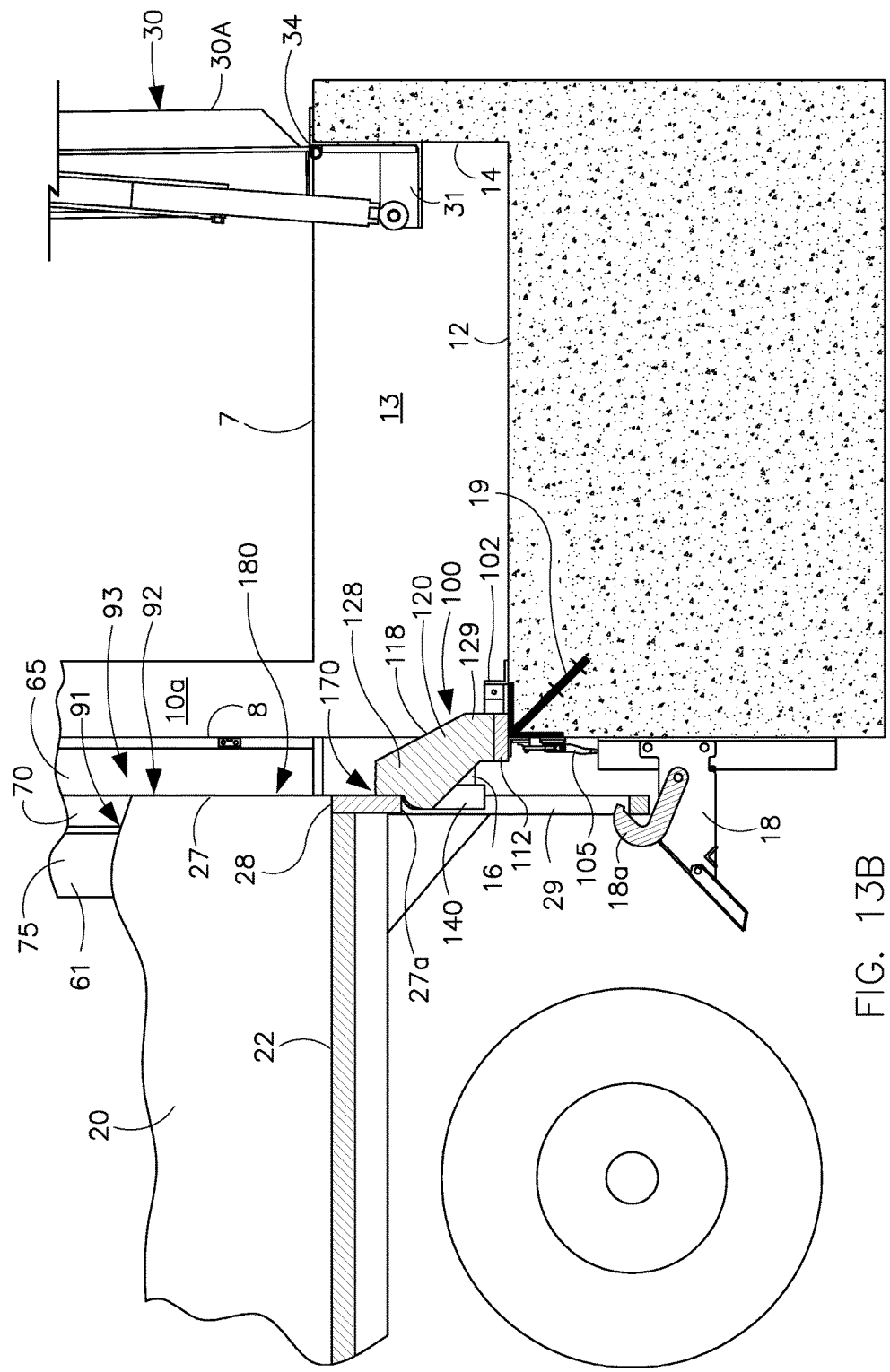
FIG. 13B is a side sectional view showing a trailer parked in the loading bay and the pit seal assembly with the central compression pad and bumper pad compressed by the rear bumper of a trailer, and the leveler in a stored position.

The end gap pads 150 are secured to the front wall 8 laterally adjacent to and in snug engagement with the bumper pads 140. As best shown in FIG. 12C, the end gap pads 150 have a base plate 151 that is rigidly secured to the front wall 8 via concrete expansion anchors or other forms of firm securement. The end gap pads 150 have a front or outer surface 152, top surface 153, bottom surface 154 and side surfaces 155, a resilient compressible interior 156 and a durable covering 157. The end gap pads 150 have a generally square shape when viewed from the front. The gap pad front surface 152 is in generally planar registry with the bumper pad front surface 142 and the vertical portion of the compression pad front surface 121. The gap pad interior 156 is preferably formed from an open cell polyurethane foam with a density of about 1.2 pounds per cubic foot, an ILD of about 28-36 lbs/50 sq.in., a tensile strength of about 12 lbs/foot, a tear strength of about 1.2 lbs/in., and memory to resiliently return to its original shape when the trailer 20 pulls away and the foam is not compressed. The vinyl covering 157 is preferably a PVC vinyl coated polyester having a weight of about 22 to 50 ounces per square yard. The interior foam 156 has a thickness so that each pad 150 extends the same distance from the front wall 8 as the compression pad 120 and bumper pads 140. One side 145 of each bumper pad 140 snuggly engages the side 155 of its adjacent end gap pad 150. The top surface 153 of each end gap pad 150 snuggly engages the bottom end 63 of its adjacent vertical side seal 61 to join or otherwise merge the continuous pit seal 170 with the continuous side seals 91, 92 or 93 to form a continuous seal around the bottom corners 27a of the rear end 27 of the trailer 20.

For shallower pits as in FIGS. 16-20, the pivoting pit seal assembly 100 is pivotally secured outside the pit 11. In this embodiment, when the pit seal 110 is in its trailer engaging position 118, it has a height defined by the bottom surface of the base plate 112 and the compression pad top surface 123. The pit seal 110 has a depth defined by the vertical portion of its front surface 121 and vertical portion 122a of its rear surface 122. The width of the pit seal 110 is equal to the width of the door opening 10 in the pit area 11. The entire pit seal assembly 100 is located and remains outside the pit 11. A modified side seal 61 is shown in FIGS. 16-20. The side seal 61 does not have a compression pad 65 and does not form a compression seal 92 or multi-seal 93. This allows the inside surface 73 of the extension pad 70 to be flushly aligned with or planar to the pit side wall 13 and the sides 10a of the door opening 10. Additionally, the extension pad 70 holds a thinner conventional flap 75a pad to form wipe seal 91 than the thicker multi-seal wipe pad 75.

The trailer-engaging, vertical portion of the front surface 121 of the compression pad 120 extends forward from the building front wall 8 as shown in FIG. 18A. The amount of forward extension provides about two inches of pad 120 compression when the trailer 20 is parked at the loading bay 6 with its ICC bar or rear guard 29 engaging the building bumper 16. The mounting bracket 102 flushly engages and is anchored to the front wall 8, and preferably to the downwardly extending portion of the angle iron 19 at the front edge 15 of the pit 11. Its pivot end 104 is spaced from the front edge 15 of the pit 11. The base pivot end 114 is pivotally secured to the bracket pivot end 104 by a pivot rod or pin 115.

Figure 17A:
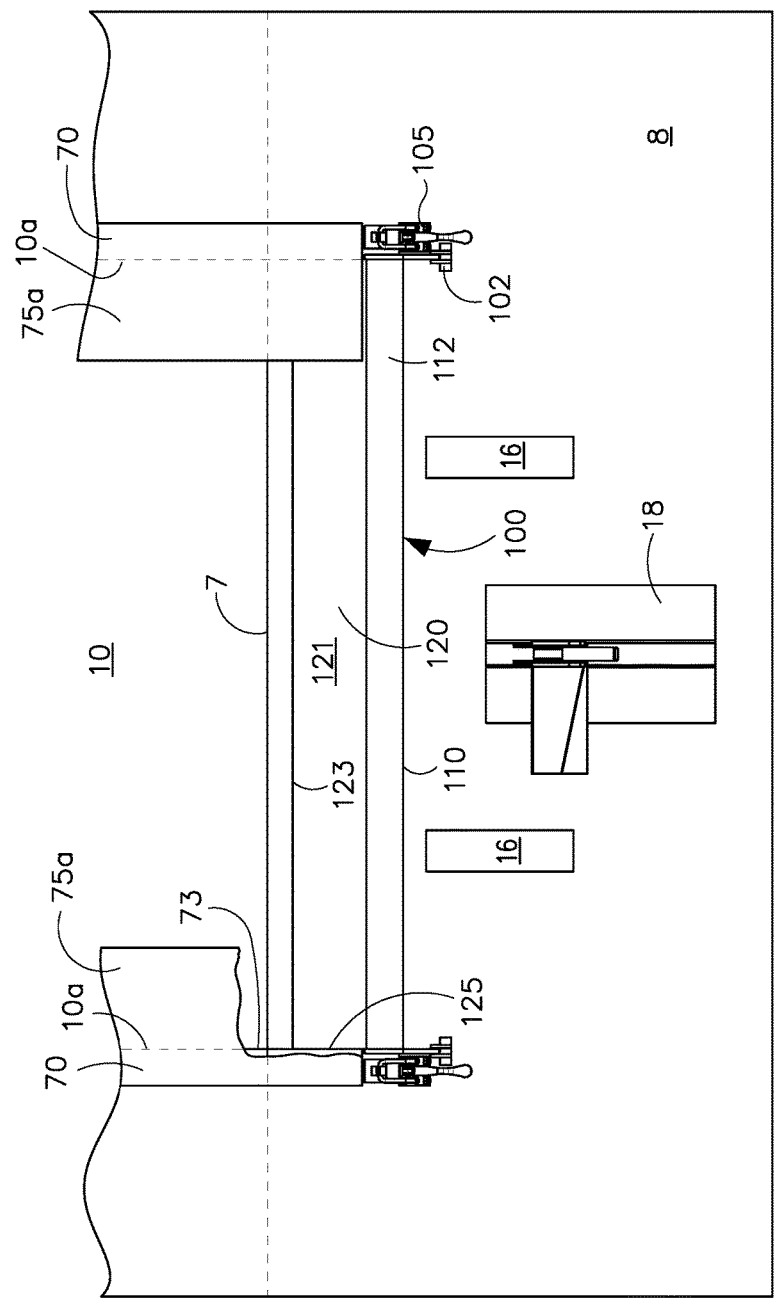
FIG. 17A is a front elevation view of a loading bay having a shallower pit equipped with the second embodiment of the pit seal assembly, and showing the pit seal extending across the width of the pit with the side ends of the central compression pad sealingly engaging the sides of the bottom ends of the side pads extending along the vertical sides of the door opening.

In this embodiment, the securement latch 105 is located outside the pit 11 laterally adjacent the bracket plate 102 as best shown in FIG. 17A. The bottom of the plate for the latch 105 flushly engages and is anchored to the front wall 8 proximal the front edge 15 of the pit 11. The clasp 107 of the latch 105 securely engages the hook 117 to hold the base plate 112 in firm engagement with the front wall 8 to maintain the pit seal 110 in its upright or upwardly and forwardly angled trailer engaging position 118. In this embodiment, the base fastener 116 or hook 117 is separate from the base plate 112. The hook 117 is anchored or otherwise firmly secured to the front wall 8 proximal pit front edge 15, and preferably is welded to the edge angle iron 19. When the latch clasp 107 is released from the hook 117, the pit seal 110 is free to rotate about its pivot end 114 and into its reclined or pivoted position 119. This is done by rotating the pit seal 110 outward from the front wall 8 and downward from the pit floor 12 as shown in FIG. 20.

Figure 21:
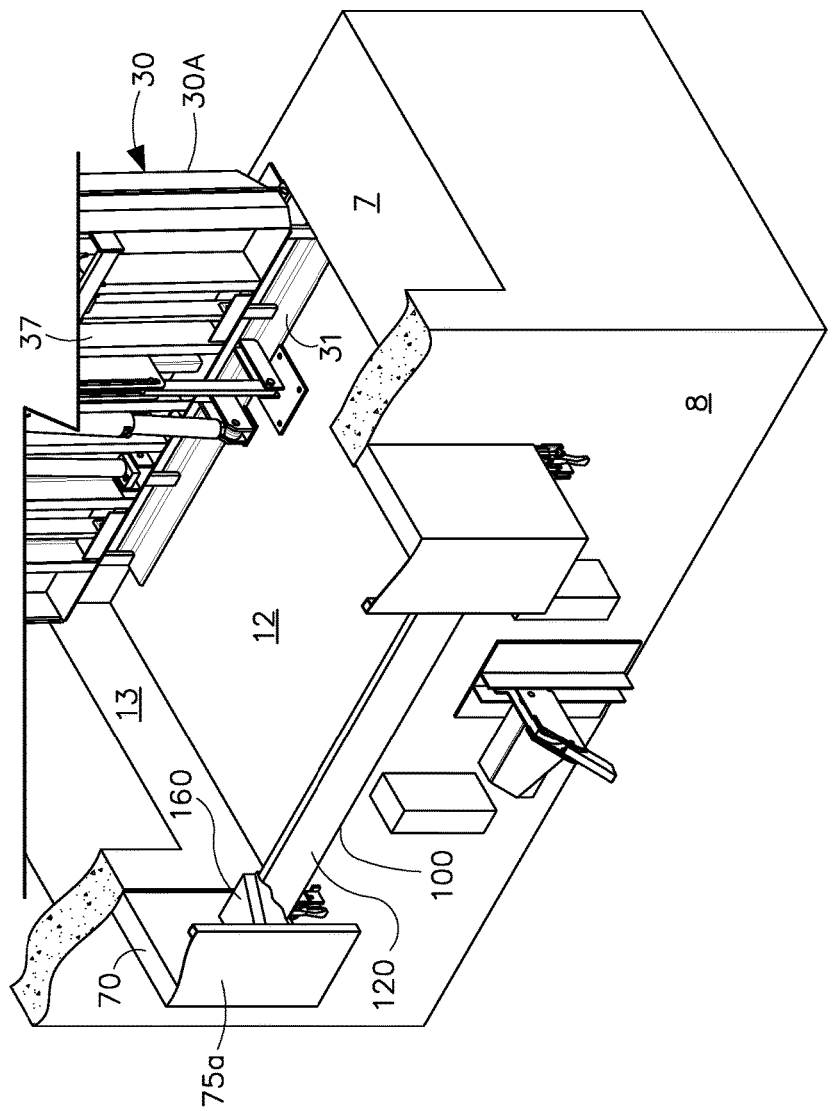
FIG. 21 is a perspective view of a loading bay having a shallower pit and the pit equipped with a second embodiment of the pit seal assembly with the pit seal and its central compression pad extending across the width of the pit, and further showing a draft pad secured to the bottom of the vertical side seals.
Figure 22C:
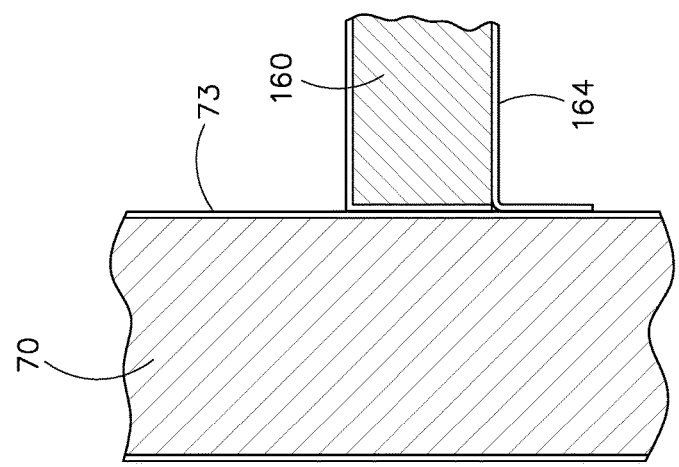
FIG. 22C is a side sectional view taken along line 22C-22C of FIG. 22A showing the draft pad secured to the bottom of the vertical side seal.
Figure 22B:
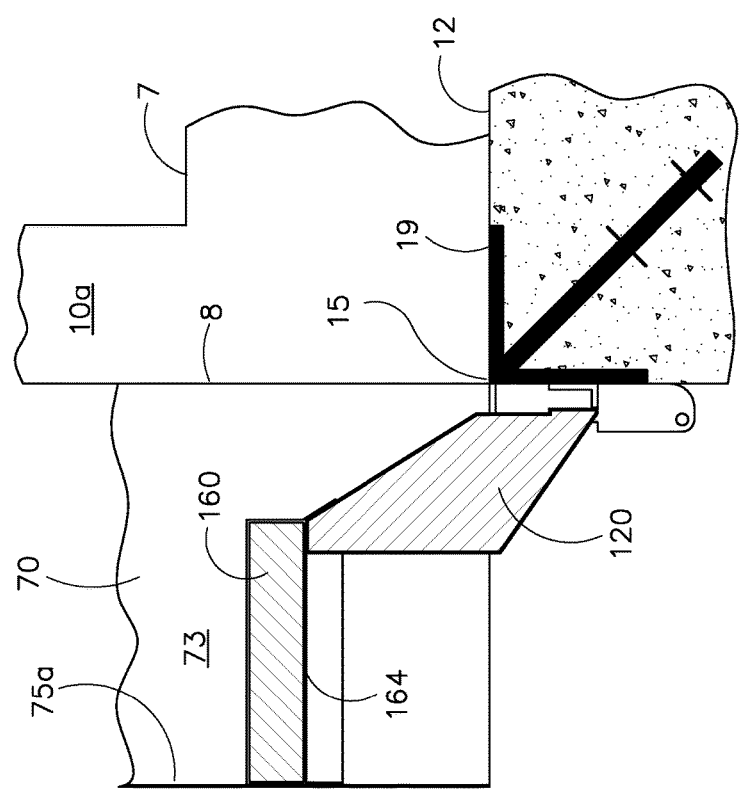
FIG. 22B is a side sectional view taken along line 22B-22B of FIG. 22A showing the draft pad secured to the bottom of the vertical side seal, and showing the top of the pit seal snuggly and sealingly engaging the bottom of the draft pad.

Both embodiments of the pit seal assembly 100 can include cornering draft pads 160 to seal off any opening between the pit seal 110 and the vertical side seal 61 as shown in FIGS. 21-22. The draft pad 160 may not be needed when the vertical side seals 61 include a compression pad 65. The draft pads 160 have a triangular shape when viewed from above as in FIG. 22A, and include an inwardly facing side surface 162 and a bottom surface 164. The draft pads 160 are stitched or otherwise firmly secured to the inside surface 73 of the bottom ends 63 of the extension pads 70 of the vertical side seals 61 as shown in FIGS. 22B and C. The top surface 123 of the pit seal compression pad 120 snuggly engages the bottom surface of the draft pad 160 when the pit seal 110 is in its upright or upwardly angled trailer engaging position 118, but the top 123 remains free to rotate down and away from the draft pad when the pit seal is rotated to its reclined position 119.

Figure 17B:
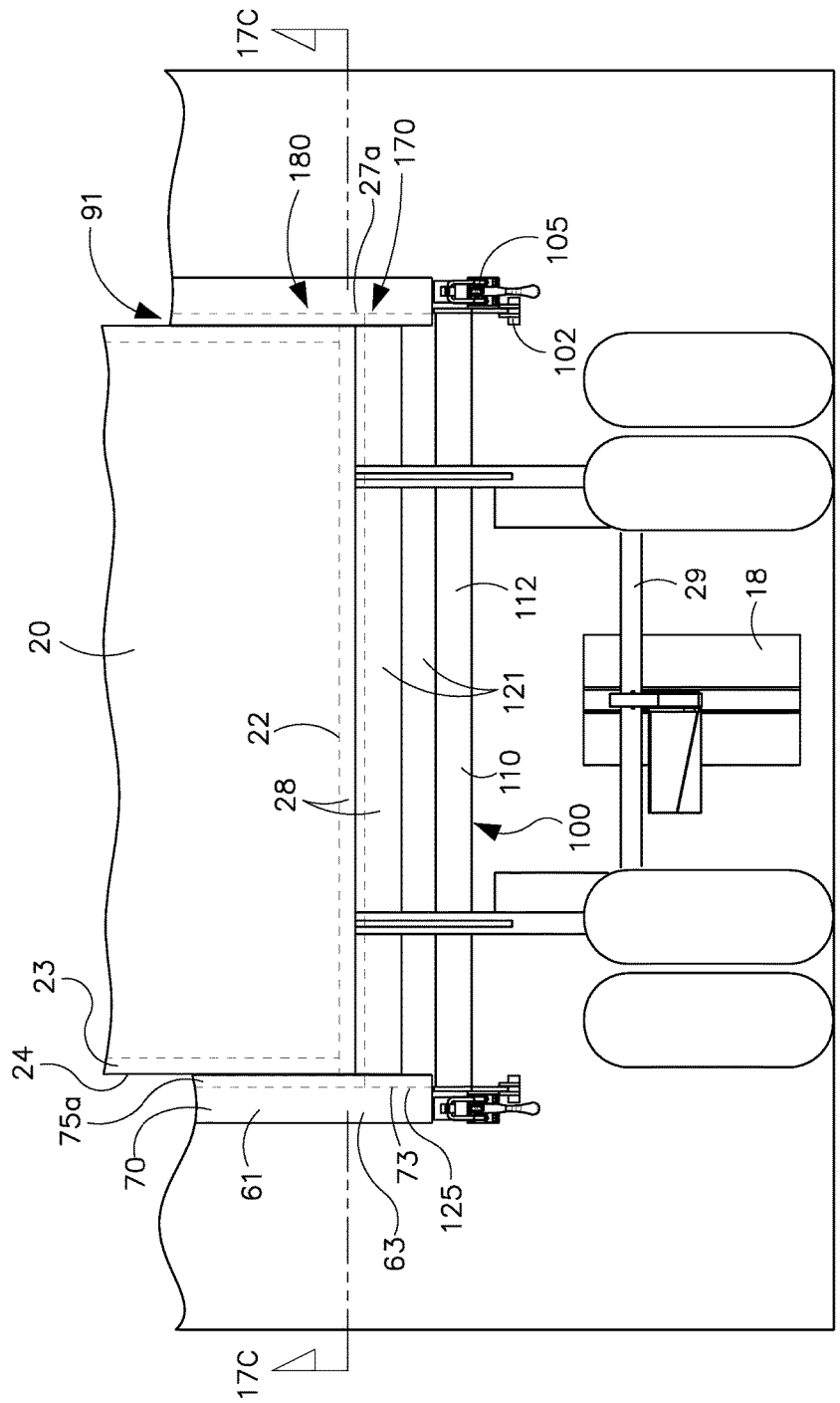
FIG. 17B is a front elevation view of a loading bay and showing the side walls and floor and rear bumper of the trailer in dotted lines to illustrate the continuous seal formed by the pit seal along the trailer bumper, and the continuous seal around the corners of the trailer and upward along the vertical side walls of the trailer.
Figure 17C:
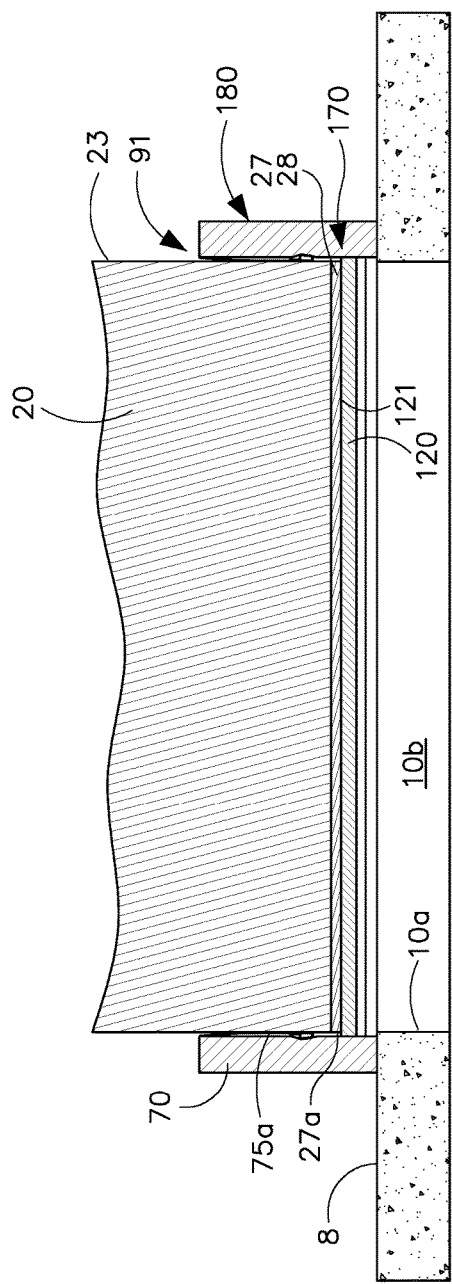
FIG. 17C is a side sectional view taken along line 17C-17C of FIG. 17B and showing the pit seal compression pad forming a continuous seal along the rear bumper of the trailer, and showing the continuous seal extending around the corners of the trailer and upward along the vertical side walls of the trailer.
Figure 18B:
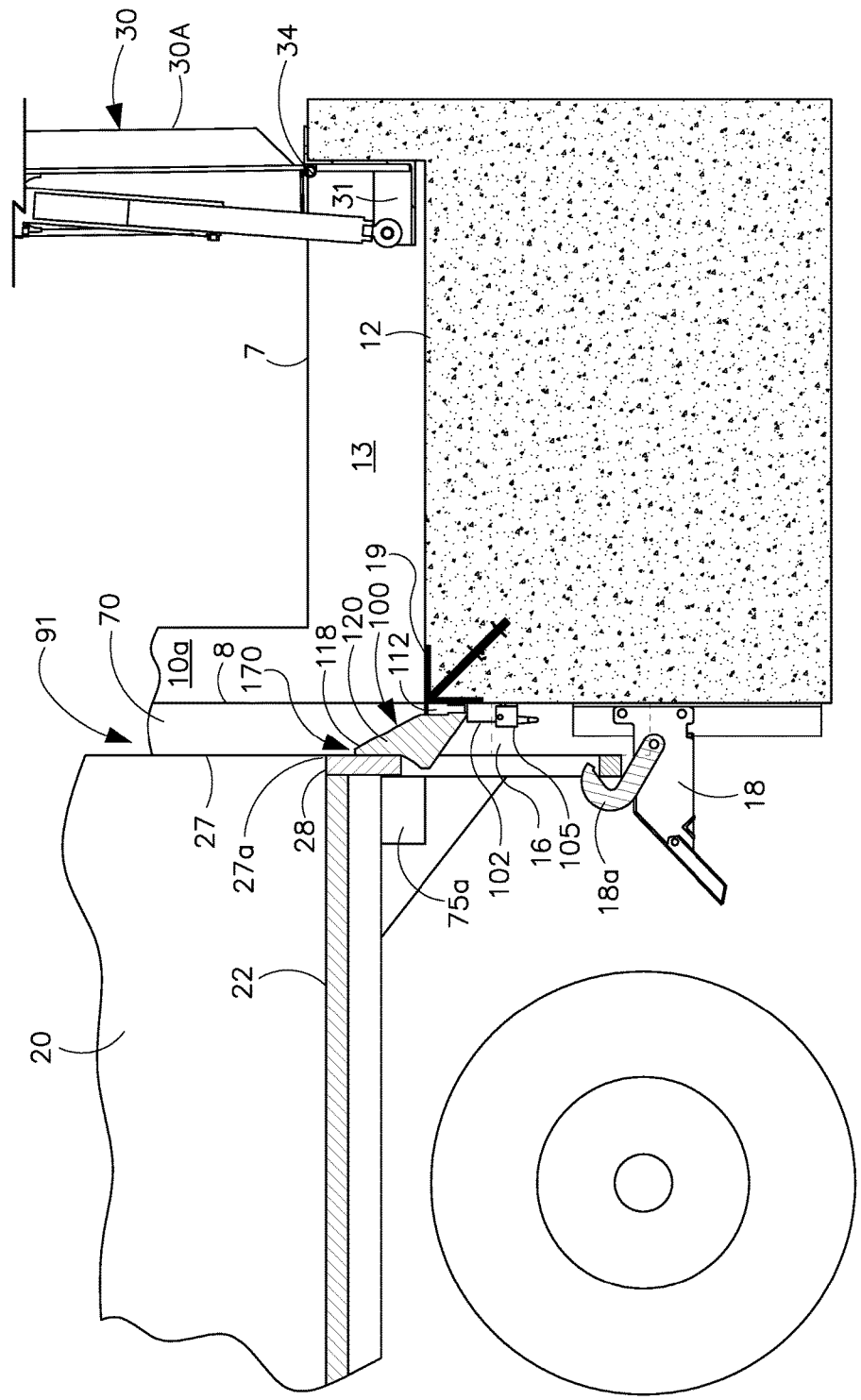
FIG. 18B is a side sectional view showing a trailer parked in the loading bay and the compression pad of the pit seal assembly compressed by the rear bumper of a trailer, and the leveler in a stored position.

Both above pivoting pit seal 100 embodiments provide a continuous seal 170 along the length of the pit 11 and the length of the rear end 27 or bumper 28 of the trailer 20 as shown in FIGS. 12B-C, 13B, 14A, 17B-C, 18B and 19. The continuous seal 170 completely seals the front of the pit 11. The seal 170 extends from the pit floor 12 to the rear end 27 or bumper 28 of the trailer 20, and extends from one side 13 of the pit 11 to the other side 13 of the pit to completely close off the pit area when a trailer is parked in the loading bay 6. For the deeper pit 11 embodiment with the building bumpers 16 located on the sides of the pit as in FIGS. 10-15, the top surface 153 of the end gap pad 150 snuggly engages the bottom ends 63 of the vertical seals 61 to form a seal around the rear 27 corners of the trailer 20 as best shown in FIGS. 12A-D. In some embodiments, the top surface 123 of the side ends 125 of the compression pad 120 snuggly engage the lower end 63 of the compression pad 65 and inside surface 73 of the extension pad 70 so that the seal 170 continues around the rear 27 corner of the trailer 20. For the shallower pit 11 embodiment with the bumpers 16 below the pit as shown in FIGS. 16-20, the inside surfaces 73 of the extension pads 70 are flush with the sidewalls 13 and the sides of the door opening 10a, so that the side ends 125 of the compression pad 120 directly and snuggly engage the inside surfaces 73 of the bottom end 63 of the extension pads 70 to form a continuous seal 170 that continues around the rear 27 corners of the trailer 20 as best shown in FIGS. 17B and C.

The pivoting pit seal assembly 100 and pit seal 110 combine with the vertical side seals 61 and top seal 80 or seal assembly 81 to provide continuous seals 91, 92, 93 and 170 around the circumference of the rear end 27 of the trailer 20. These seals 91, 92, 93 and 170 combine to form a continuous 360-degree seal 180 around the rear end 27 of the trailer 20 when it is parked in the loading bay 6. The continuous pit seal 170 and continuous 360-degree seal 180 are formed by the passive engagement of the rear end 27 of the trailer 20 with the side seals 61, top seal 80 or 81 and pit seal assembly 100. No active components, either manually driven or powered equipment, are needed to form the pit seal 170 or 360 degree seal 180.

In both the deeper and shallower pit embodiments, when the deck 41 of the leveler 30 is lowered to or beyond a predetermined incline angle, the bottom end of the lip header 55 and lugs 56 engage and press into the angled rear surface 122 of the compression pad 120 as best shown in FIG. 19. This pressing engagement by the lip header 55 and lip lugs 56 and compression of rear pad surface 122 helps maintain a continuous precautionary compression seal between the front pad surface 121 and the rear end 27 bumper 28 of the trailer 20.

Figure 14A:
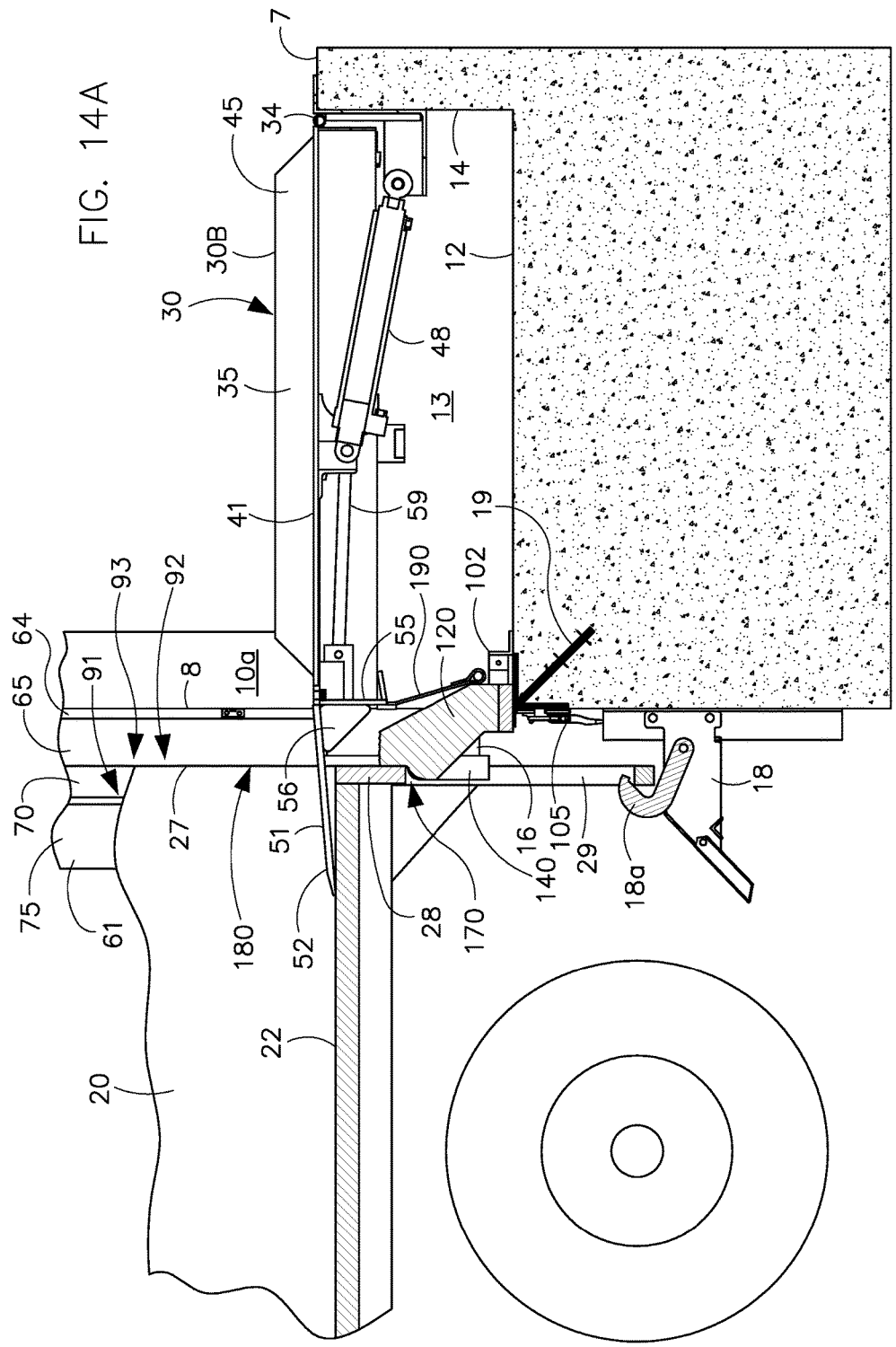
FIG. 14A is a side sectional view showing a trailer parked in the loading bay and the pit seal assembly with the central compression pad and bumper pad compressed by the rear bumper of a trailer, and the leveler in a lowered position with the lip engaging the trailer bed.

The pit seal assembly 100 includes a curtain 190 hanging from the lip header 55 as shown in FIGS. 14A-B. The curtain 190 has an upper end 191 secured to the bottom of the header 55 and a lower free end 192 that hangs down and is preferably weighted 193. The curtain 190 spans the width of the header 55 and provides a precautionary seal 195 for certain styles of trailers and certain situations where the compression pad 120 does not engage the rear bumper 28 of the trailer 20 as in FIG. 14B.

While the invention has been described with reference to two preferred embodiments, it will be understood by those skilled in the art that various changes may be made and equivalents may be substituted without departing from the broader aspects of the invention. For example, it should be understood by persons of ordinary skill in the art that the side seals 61 and top seals can be conventional seals as well as the seals discussed herein. It should also be understood by persons of ordinary skill in the art that the dimensions discussed herein regarding the compression pad 120, bumper pad 140 and gap pad 150 can vary depending on the dimensions and overall shape of the loading bay 6 and pit 11, the height and shape of the trailers 20 and their rear bumper 28 parking at the loading bay, and the type of telescoping lip leveler 30 and vertical side seals 61 installed at the loading bay.

We claim:

1. A pivoting pit seal apparatus for a loading dock or bay equipped with a dock leveler having a telescoping lip that engages a bed of a trailer when the trailer is parked at the loading dock or bay, the loading dock or bay having a front wall, a door opening leading into an interior of the loading dock or bay, a dock floor and a pit for the dock leveler, the pit having a pit floor, pit floor front edge, pit side walls and pit width, the trailer having a width and a rear end with a rear bumper, said pivoting pit seal apparatus comprising:
    a mounting bracket having a bracket pivot point, said bracket being located proximal the pit floor front edge and firmly secured to one of either the pit floor and front wall;
    a securement latch having a latch fastener, said latch being located proximal the pit floor front edge and firmly secured to one of either the pit floor and pit front wall;
    a pit seal assembly having a base plate and compression pad, said base plate having a pivot end and a base fastener, said pivot end being in secured pivoting engagement with said bracket pivot point to allow pivoting rotation of said pit seal assembly between an upwardly angled trailer engaging position to a reclined position, and said latch fastener being adapted to selectively engage and hold said base fastener to maintain said pit seal assembly in said angled trailer engaging position, said compression pad having a front surface, rear surface, a top surface, a bottom surface and side end surfaces, said front surface being positioned forward the front wall, said top surface being located below the dock floor and telescoping lip, one of either said rear surface and bottom surface being firmly held by said base plate, and said compression pad extending the width of the pit with said side end surfaces snuggly engaging the pit side walls; and,
    wherein the rear bumper of the trailer engages and compresses said front surface of said compression pad when the trailer is parked in the loading dock or bay to form a continuous pit seal spanning the width of one of either the pit and the trailer.

2. The pivoting pit seal apparatus of claim 1, and wherein the pit floor front edge has an embedded angle iron, and wherein said mounting bracket and securement latch are secured to the angle iron.

3. The pivoting pit seal apparatus of claim 1, and wherein the loading dock or bay has building bumpers extending outwardly from the front wall a predetermined distance, and said front surface of said compression mad extends outwardly from the front wall further than the building bumpers.

4. The pivoting pit seal apparatus of claim 3, and wherein said front surface of said compression pad extends about two inches further out from the front wall than the building bumpers.

5. The pivoting pit seal apparatus of claim 3, and wherein the building bumpers are laterally adjacent to the sidewalls of the pit, and further comprising bumper pads and end gap pads, said bumper pads having front and side surfaces and being positioned over the building bumpers, the end gap pads having front and side surfaces, each end gap pad being positioned laterally adjacent one of said building bumper pads, said compression pad, bumper pads and gap pads being in linear alignment, and said front surfaces of said compression pad, bumper pads and gap pads being in engaged planar alignment, said continuous pit seal extending along said front surfaces of said of said compression pad, bumper pads and end gap pads.

6. The pivoting pit seal apparatus of claim 1, and wherein said compression pad is angled upwardly and outwardly from the pit floor when the pit seal assembly is in the angled trailer engaging position.

7. The pivoting pit seal apparatus of claim 6, and wherein the pivoting pit seal assembly is pivotally secured to the pit floor inside the pit.

8. The pivoting pit seal apparatus of claim 6, and wherein the pivoting pit seal is pivotally secured to the front wall of the loading dock or bay outside the pit, and said compression pad is angled upwardly and outwardly from the pit floor front edge when the pit seal assembly is in the upwardly angled trailer engaging position.

9. The pivoting pit seal apparatus of claim 6, and wherein the dock leveler has a deck and the telescoping lip has a downwardly extending lip header, and said compression pad has an upwardly facing angled portion with an angled surface, and a bottom of the lip header engages said angled surface of said compression pad when the deck is lowered and the lip engages the bed of the trailer.

10. The pivoting pit seal apparatus of claim 9, and wherein said pit seal assembly is pivotably rotatable to the reclined position away from the pit floor front edge.

11. A pit seal apparatus for a loading dock or bay equipped with a dock leveler having a telescoping lip that engages a bed of a trailer when the trailer is parked at the loading dock or bay, the loading dock or bay having a front wall, a door opening leading into an interior of the loading dock or bay, a dock floor and a pit for the dock leveler, the pit having a pit floor, pit floor front edge, pit side walls and pit width, the trailer having a width and a rear end with a rear bumper, the pit floor front edge having an embedded angle iron, said pit seal apparatus comprising:
 a mounting bracket firmly secured the embedded angle iron and located on to one of either the pit floor and front wall;
 a pit seal assembly having a base plate and compression pad, said base plate being in secured engagement with said mounting bracket, said mounting bracket and base plate holding said compression pad in an upwardly and forwardly angled trailer engaging position, said compression pad having a front surface, rear surface, a top surface, a bottom surface and side end surfaces, said front surface being positioned forward the front wall, said top surface being located below the dock floor, one of either said rear surface and bottom surface being firmly held by said base plate, and said compression pad extending the width of the pit with said side end surfaces snuggly engaging the pit side walls; and,
 wherein the rear bumper of the trailer engages and compresses said front surface of said pit seal compression pad when the trailer is parked in the loading dock or bay to form a continuous pit seal spanning the width of one of either the pit and the trailer.

12. The pivoting pit seal apparatus of claim 11, and wherein the loading dock or bay has building bumpers extending outwardly from the front wall a predetermined distance, and said front surface of said compression mad extends outwardly from the front wall further than the building bumpers.

13. The pivoting pit seal apparatus of claim 12, and wherein said front surface of said compression pad extends about two inches further out from the front wall than the building bumpers.

14. The pit seal apparatus of claim 13, and wherein said pit seal assembly is pivotally secured to said angle iron.

15. A 360-degree trailer seal apparatus for a loading dock or bay equipped with a dock leveler having a telescoping lip that engages a bed of a trailer when the trailer is parked at the loading dock or bay, the trailer having a predetermined height and a predetermined width and a rear end with a rear bumper, the loading dock or bay having a building front wall, a door opening leading into an interior of the loading dock or bay, a dock floor and a pit for the dock leveler, the pit having a pit floor, pit floor front edge, pit side walls and pit width, said 360-degree trailer seal apparatus comprising:
 a pit seal assembly having a mounting base and a compression pad, said mounting base being proximal the pit floor front edge and secured to one of either the pit floor and front wall, said compression pad having a front surface, rear surface, top, bottom and side end surfaces, said mounting base securably holding said compression pad with said front surface positioned forward the building front wall and said top being located below the dock floor, said compression pad extending the width of the pit; the rear bumper of the trailer engaging and compressing said front surface of said compression pad when the trailer is parked in the loading dock or bay to form a continuous pit seal spanning the width of one of either the pit and the trailer;
 side seal assemblies located along respective sides of the door opening and with a bottom portion extending below the dock floor, each of said side seal assemblies having an extension pad and one of either a wipe pad and a wipe flap to sealingly engage side wall surfaces of the trailer to form a continuous side seal along side walls of the trailer and spanning the height of the trailer;
 a top seal assembly having a canopy and one of either a curtain wipe pad and top wipe flap to sealingly engage the side wall surfaces of the trailer to form a continuous top seal along a roof of the trailer and spanning the width of the trailer; and,
 wherein said continuous pit seal formed by said pit seal assembly, said continuous side seals formed by said side seal assemblies, and said continuous top seal formed by said top seal assembly combine to form a 360-degree trailer seal extending around a circumference of the rear end of the trailer.

16. The 360-degree trailer seal apparatus of claim 15, and wherein the side seal assemblies include a compression pad.

17. The 360-degree trailer seal apparatus of claim 15, and wherein the rear end of the trailer has bottom corners, and wherein said extension pads have an inner side surface aligned in planar registry with the pit side walls, and said side end surfaces of said compression pad snuggly and sealingly engage said inner side surfaces of said extension pads to join said pit seal assembly and said side seals and extend said pit and side seals around the bottom corners of the trailer to form said 360-degree continuous trailer seal.

18. The 360-degree trailer seal apparatus of claim 17, and further comprising draft pads secured to bottom ends of said side seal assemblies, said side end surfaces of said compression pad snuggly engaging a respective lower surface of said draft pad, and one of either said wipe pad and wipe flap of said side seal assemblies sealingly engage a respective side of said draft pad when the trailer is parked in the loading dock or bay.

* * * * *